(12) United States Patent
Okuyoshi et al.

(10) Patent No.: US 8,293,421 B2
(45) Date of Patent: Oct. 23, 2012

(54) FUEL CELL SYSTEM

(75) Inventors: Masahiro Okuyoshi, Toyota (JP);
Masaaki Matsusue, Mishima (JP);
Masashi Toida, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/163,381

(22) Filed: Jun. 17, 2011

(65) Prior Publication Data
US 2011/0250519 A1  Oct. 13, 2011

Related U.S. Application Data

(63) Continuation of application No. PCT/JP2008/073784, filed on Dec. 26, 2008.

(51) Int. Cl.
*H01M 8/04* (2006.01)
(52) U.S. Cl. .......... 429/447; 429/443; 429/428
(58) Field of Classification Search .......... None
See application file for complete search history.

(56) References Cited

U.S. PATENT DOCUMENTS
6,120,925 A * 9/2000 Kawatsu et al. .......... 429/412

FOREIGN PATENT DOCUMENTS
| JP | 2004-111196 A | 4/2004 |
|---|---|---|
| JP | 2004-207139 A | 7/2004 |
| JP | 2004-335444 A | 11/2004 |
| JP | 2005-222854 A | 8/2005 |
| JP | 2006-073427 A | 3/2006 |
| JP | 2006-196262 A | 7/2006 |
| JP | 2007-287547 A | 11/2007 |
| JP | 2008-041505 A | 2/2008 |
| JP | 2008-091329 A | 4/2008 |
| JP | 2008-140734 A | 6/2008 |
| JP | 2009-004151 A | 1/2009 |

OTHER PUBLICATIONS

ISR issued Apr. 28, 2009 in PCT/JP2008/073784.

* cited by examiner

*Primary Examiner* — Barbara Gilliam
*Assistant Examiner* — Jennifer Rea
(74) *Attorney, Agent, or Firm* — Kenyon & Kenyon LLP

(57) ABSTRACT

The aim of the invention is to improve the accuracy of estimating residual water content in a fuel cell system adopting an intermittent operation mode and to accurately suppress cell voltage reduction due to water accumulation caused by the intermittent operation. The fuel cell system includes: a fuel cell having a cell laminate; an estimating unit for estimating a residual water content distribution in a reactant gas flow channel and a moisture content distribution in an electrolyte membrane in a cell plane of each single cell while taking into consideration water transfer that occurs between an anode electrode and a cathode electrode via the electrolyte membrane; and an operation control unit which changes the content of an intermittent operation when a residual water content in the reactant gas flow channel estimated by the estimating unit is equal to or greater than a predetermined threshold.

24 Claims, 21 Drawing Sheets

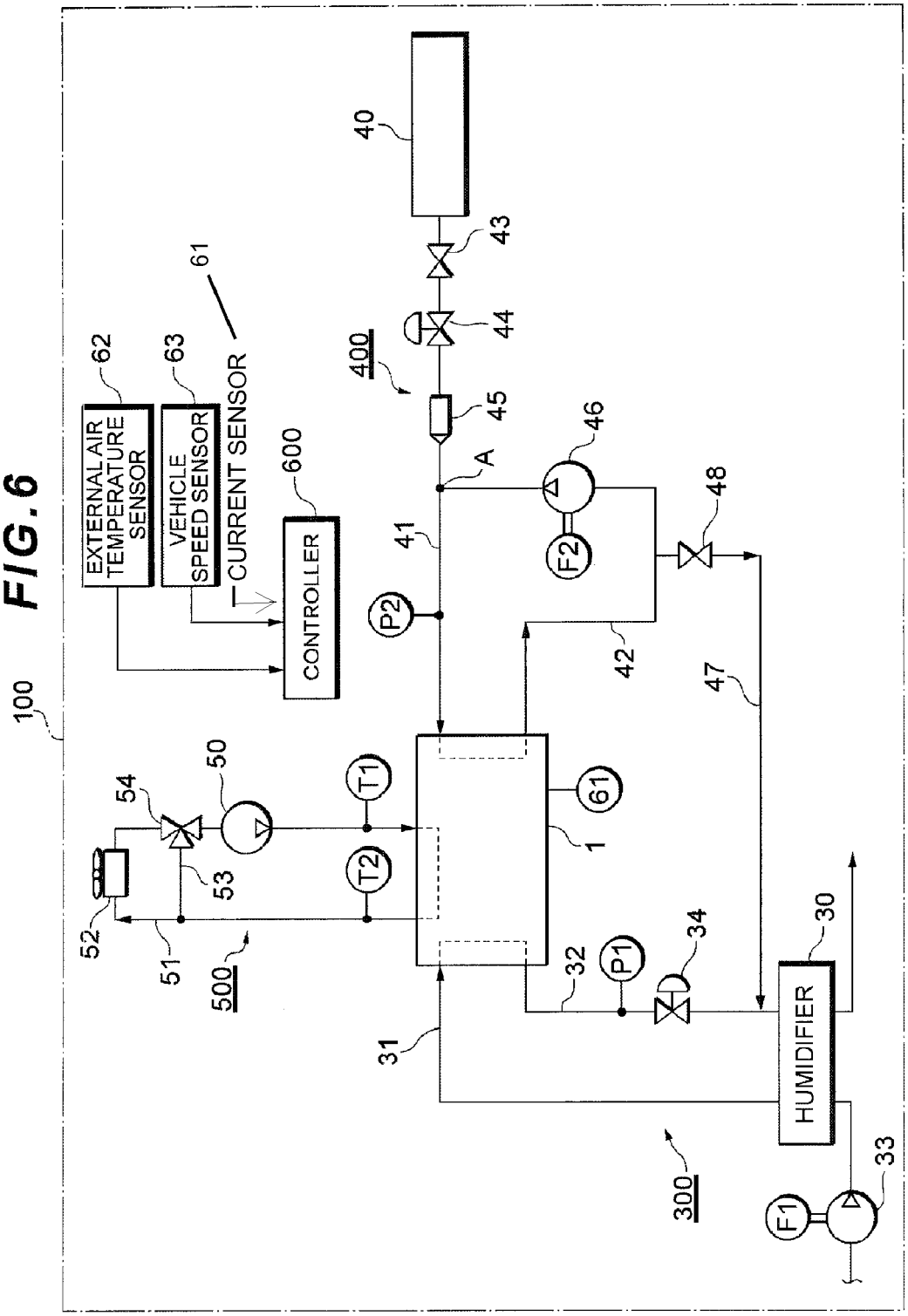

FIG. 14

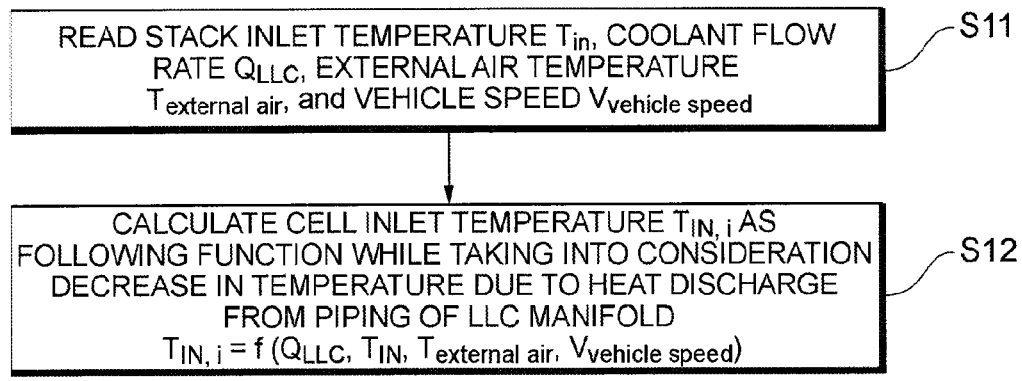

S11: READ STACK INLET TEMPERATURE $T_{in}$, COOLANT FLOW RATE $Q_{LLC}$, EXTERNAL AIR TEMPERATURE $T_{external\ air}$, and VEHICLE SPEED $V_{vehicle\ speed}$ S12: CALCULATE CELL INLET TEMPERATURE $T_{IN,i}$ AS FOLLOWING FUNCTION WHILE TAKING INTO CONSIDERATION DECREASE IN TEMPERATURE DUE TO HEAT DISCHARGE FROM PIPING OF LLC MANIFOLD
$T_{IN,i} = f(Q_{LLC}, T_{IN}, T_{external\ air}, V_{vehicle\ speed})$

FIG. 15A

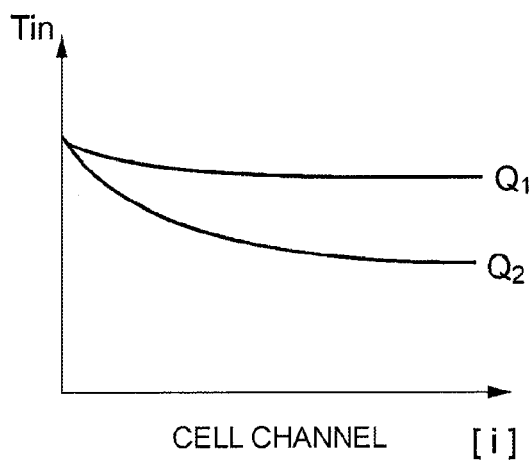

FIG. 15B

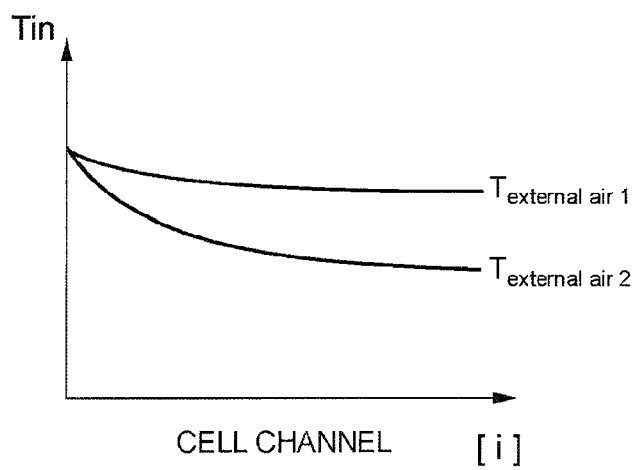

FUEL CELL SYSTEM

This is a U.S. continuation application of PCT/JP2008/073784 filed 26 Dec. 2008, the content of which is incorporated herein by reference.

TECHNICAL FIELD

The present invention relates to a fuel cell system that uses an estimation of a water content of a proton-exchange membrane fuel cell.

BACKGROUND ART

As is conventionally well known, efficient power generation by a proton-exchange membrane fuel cell desirably involves keeping an electrolyte membrane in a moderately wet condition and preventing a water content inside the fuel cell from becoming deficient or excessive. An example of a known technique for controlling the water content in a cell plane of a fuel cell is described in Patent Document 1 (Japanese Patent Laid-Open No. 2004-335444). Patent Document 1 discloses controlling the distribution of water content as droplets or water vapor in a cell plane by adjusting at least one of pressure, humidity, temperature, and flow rate of a reactant gas (a general term for oxidation gas typified by air and fuel gas typified by hydrogen gas) and pressure drop characteristics defined by flow channel geometry.

DISCLOSURE OF THE INVENTION

Problems to be Solved by the Invention

However, in an actual single cell, transfer of water through an electrolyte membrane occurs between an anode electrode and a cathode electrode. In this regard, Patent Document 1 does not consider water transfer between electrodes and thus it is difficult for Patent Document 1 to accurately estimate and control water content distribution in a cell plane.

Further, generally, there are fuel cell systems which adopt an intermittent operation mode of a fuel cell for the purpose of improving fuel efficiency. During an intermittent operation, operations of auxiliaries which supply reactant gas to an anode electrode and a cathode electrode are suspended.

However, there are cases where air and hydrogen gas remaining from before the suspension may cause an electrochemical reaction and generate water during the intermittent operation. In addition, when external air temperature is low, condensation of water vapor may occur. As a result, a residual water content in the form of liquid water may increase in a reactant gas flow channel during the intermittent operation. Accordingly, after the intermittent operation, there is a possibility of cell voltage reduction and deterioration of an electrode catalyst at a single cell with a high residual water content when supplying reactant gas to extract a current from the fuel cell.

It is an object of the present invention to improve residual water content estimation accuracy and accurately suppress cell voltage reduction due to water accumulation caused by an intermittent operation using a fuel cell system which adopts an intermittent operation mode.

Means for Solving the Problems

In order to achieve the object described above, a fuel cell system according to the present invention includes a fuel cell having a cell laminate formed by laminating a plurality of single cells, each of the single cells having an anode electrode, a cathode electrode, an electrolyte membrane existing between the anode electrode and the cathode electrode, and a reactant gas flow channel, the fuel cell system adopting a mode in which an intermittent operation of the fuel cell is performed. The fuel cell system comprises: an estimating unit for estimating a residual water content distribution in the reactant gas flow channel and a moisture content distribution in the electrolyte membrane in a cell plane of each single cell while taking into consideration water transfer that occurs between the anode electrode and the cathode electrode via the electrolyte membrane; and an operation control unit which changes the content of the intermittent operation when the residual water content in the reactant gas flow channel estimated by the estimating unit is equal to or greater than a predetermined threshold.

According to the present invention, since water transfer between electrodes is taken into consideration, the estimation accuracy of residual water content distribution and moisture content distribution can be improved not only in a cell plane but also in a cell lamination direction. In addition, since the content of the intermittent operation is changed using the improved estimation result, cell voltage reduction caused by water accumulation due to the intermittent operation can be suppressed with high accuracy. For example, when a residual water content equal to or greater than the threshold is estimated, the content of the intermittent operation can be changed so as to suppress a further increase in the residual water content or to promote a reduction in the residual water content.

According to a favorable mode, the operation control unit may prohibit the intermittent operation in a case where a residual water content equal to or greater than the threshold is estimated.

Consequently, since an increase in the residual water content which accompanies the execution of the intermittent operation can be suppressed, cell voltage reduction caused by water accumulation due to the intermittent operation can be suppressed with high accuracy.

According to another favorable mode, the operation control unit may be configured so as not to suspend the supply of reactant gas to only the side of whichever electrode at which a residual water content equal to or greater than the threshold has been estimated among the anode electrode and the cathode electrode.

Consequently, discharge of the residual water content can be promoted by supplying the reactant gas and cell voltage reduction can be suppressed with high accuracy.

According to yet another favorable mode, the operation control unit may permit the intermittent operation after performing a scavenging process on the fuel cell when a residual water content equal to or greater than the threshold is estimated.

Consequently, since the residual water content can be reduced by the scavenging process, the intermittent operation can be executed without causing the residual water content to become excessive. Accordingly, cell voltage reduction after the intermittent operation can be suppressed.

More favorably, the operation control unit may change at least one of a control amount and a control time of the scavenging process based on at least one of a position and a size of a residual water content that equals or exceeds the threshold.

Consequently, the efficiency of the scavenging process can be improved. For example, in a case where the residual water content is relatively low, scavenging time can be shortened by reducing the control time of the scavenging process as compared to a case where the residual water content is relatively high.

Here, discharging characteristics of water in the reactant gas flow channel due to the flow of reactant gas differ according to a position in the cell lamination direction and a position in the cell plane. Water accumulated at a position where water cannot be readily discharged may present a possibility of cell voltage reduction. As such, the scavenging process is desirably thoroughly performed.

Therefore, in a favorable mode of the present invention, in a case where the cell laminate is configured so that reactant gas is supplied to the reactant gas flow channel of each single cell by having the reactant gas supplied in the cell lamination direction, the further a single cell is positioned on a downstream side in the supply direction of the reactant gas in the cell laminate, the operation control unit may increase at least one of a control amount and a control time of the scavenging process. In addition, the closer to an inlet-side of the reactant gas to the reactant gas flow channel in a cell plane, the operation control unit may increase at least one of the control amount and the control time of the scavenging process.

Such a configuration enables the scavenging process to be appropriately performed in a case where water is accumulated at a position in the cell lamination direction or in the cell plane where water cannot be readily discharged.

In addition, preferably, the reactant gas flow channel may include a fuel gas flow channel for supplying fuel gas to the anode electrode and an oxidation gas flow channel for supplying oxidation gas to the cathode electrode. Furthermore, the operation control unit may execute the scavenging process on the fuel gas flow channel when it is estimated that a residual water content of the fuel gas flow channel is equal to or greater than the threshold, while the operation control unit may execute the scavenging process on the oxidation gas flow channel when it is estimated that a residual water content of the oxidation gas flow channel is equal to or greater than the threshold.

Consequently, necessary scavenging processes can be performed separately for the fuel gas flow channel and the oxidation gas flow channel.

Moreover, preferably, the estimating unit may estimate the residual water content distribution even during the scavenging process, and the operation control unit may permit the intermittent operation in a case where the residual water content estimated during the scavenging process falls below a predetermined threshold.

Consequently, since the intermittent operation is permitted after confirming through estimation that the residual water content has been reduced, water accumulation due to the intermittent operation can be reliably suppressed.

In addition, according to another favorable mode, the operation control unit may perform a circulating operation process for resupplying fuel gas discharged from the anode electrode-side to the anode electrode when a residual water content equal to or greater than the threshold is estimated.

Consequently, an accumulation of residual water on the side of the anode electrode during the intermittent operation can be suppressed and a cell voltage reduction after the intermittent operation can be suppressed.

In this case, the operation control unit favorably may change at least one of a control amount and a control time of the circulating operation process based on at least one of a position and a size of a residual water content that equals or exceeds the threshold.

Consequently, in the same manner as the scavenging process described above, the efficiency of the circulating operation process can be improved.

Preferably, the predetermined threshold described above may differ between the side of the fuel gas flow channel and the side of the oxidation gas flow channel, among positions of single cells in the cell lamination direction, or between an inlet-side and an outlet-side of reactant gas to/from the reactant gas flow channel in a cell plane.

Consequently, thresholds corresponding to respective characteristics of the fuel gas flow channel and the oxidation gas flow channel and the discharging characteristics of water described above can be used.

BEST MODE FOR CARRYING OUT THE INVENTION

Hereinafter, a preferred embodiment of the present invention will be described with reference to the accompanying drawings. First, an overview of a fuel cell system including a fuel cell and a water content estimation apparatus thereof for the fuel cell will be described, followed by a description of an estimation of a water content of a fuel cell and a control example using the estimation. Hereinafter, hydrogen gas will be described as an example of a fuel gas and air will be described as an example of an oxidation gas. A fuel gas and an oxidation gas may collectively be described as a reactant gas.

A. Overview of Fuel Cell

As illustrated in FIGS. 1 and 2, a fuel cell 1 with a stack structure includes a cell laminate 3 formed by laminating a plurality of single cells 2 of the proton-exchange membrane type. Collector plates 5a, 5b, insulating plates 6a, 6b, and end-plates 7a, 7b are respectively arranged on outer sides of single cells 2 on both ends of the cell laminate 3 (hereinafter, referred to as "end cells 2a"). Tension plates 8, 8 are bridged across the end-plates 7a, 7b and fixed by a bolt 9. An elastic module 10 is provided between the end-plate 7b and the insulating plate 6b.

Hydrogen gas, air, and a coolant are supplied to a manifold 15a inside the cell laminate 3 from a supply pipe 14 connected to supply ports 11a, 12a, and 13a of the end-plate 7a. Subsequently, the hydrogen gas, air, and the coolant flow in a planar direction of the single cell 2 and reach a manifold 15b inside the cell laminate 3, and are discharged to the outside of the fuel cell 1 from an exhaust pipe 16 connected to exhausts 11b, 12b and 13b of the end-plate 7a. Note that although the supply pipe 14, the manifolds 15a, 15b, and the exhaust pipe 16 are provided corresponding to each fluid (hydrogen gas, air, and coolant), same reference characters are assigned in FIG. 2 and descriptions thereof are omitted.

As illustrated in FIG. 3, the single cell 2 includes an MEA 20 and a pair of separators 22A, 22B. The MEA 20 (Membrane Electrode Assembly) is constituted by an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A while an air flow channel 25B of the separator 22B faces the electrode 24B. In addition, coolant flow channels 26A, 26B of the separators 22A, 22B communicate with each other between adjacent single cells 2, 2.

FIG. 4 is a plan view of the separator 22A. The separator 22A includes a hydrogen inlet 27a, an air inlet 28a, a coolant inlet 29a, a hydrogen outlet 27b, an air outlet 28b, and a coolant outlet 29b respectively penetratingly formed on an outer side of the hydrogen flow channel 25A. Inlets 27a, 28a, and 29a constitute a part of the manifold 15a that corresponds to each fluid. In the same manner, outlets 27b, 28b, and 29b constitute a part of the manifold 15b that corresponds to each fluid.

At the separator 22A, hydrogen gas is introduced into a hydrogen flow channel 41 from the inlet 27a and discharged to the outlet 27b. The coolant flows in a similar manner. In addition, while a detailed description will not be given, air also flows in a planar direction in the separator 22B configured similar to the separator 22A. In this manner, hydrogen gas and air are supplied to the electrodes 24A, 24B in the single cell 2 to cause an electrochemical reaction inside the MEA 20 which produces electromotive force. Furthermore, the electrochemical reaction also generates water and heat on the side of the electrode 24B. The heat at each single cell 2 is reduced due to subsequent flow of the coolant.

FIGS. 5A to 5C are schematic plan views illustrating other flow channel geometries of a separator to which the present embodiment is applicable. In place of the mode of the straight gash flow channel (repetitive concavities and convexities extending in a single direction) illustrated in FIG. 4, the flow channel geometries of the flow channels 25A, 25B, 26A, and 26B can take a serpentine flow channel shape having folded portions midway as illustrated in FIG. 5A. In addition, as illustrated in FIG. 5B, the flow channels 25A, 25B, 26A, and 26B can take a wavy form or, as illustrated in FIG. 5C, a flat plate-like form without concavities and convexities. Furthermore, as for the flow pattern of the reactant gas, a counter-flow type in which hydrogen gas and air flow in opposite directions may be adopted in place of the coflow type (in which hydrogen gas and air flow in the same direction) as can be understood from FIGS. 1 and 4. Moreover, the separators 22A, 22B may be oriented either vertically or horizontally. In other words, estimation of a water content of the fuel cell 1 to be described later is not limited to a hardware configuration of the fuel cell 1.

B. Overview of Fuel Cell System

As illustrated in FIG. 6, a fuel cell system 100 includes an air piping system 300, a hydrogen piping system 400, a coolant piping system 500, and a controller 600. In addition to being mountable on various mobile objects such as a vehicle, a ship, an airplane, and a robot, the fuel cell system 100 is applicable to a stationary power source. Here, an example of the fuel cell system 100 mounted on a vehicle will be described.

The air piping system 300 is responsible for supplying air to and discharging air from the fuel cell 1, and includes a humidifier 30, a supply flow channel 31, an exhaust flow channel 32, and a compressor 33. Atmospheric air (air in a low moisture condition) is taken in by the compressor 33 and force-fed to the humidifier 30. Water exchange between atmospheric air and an oxidation off-gas in a high moisture condition is performed at the humidifier 30. As a result, adequately humidified air is supplied from the supply flow channel 31 to the fuel cell 1. A back pressure valve 34 for regulating an air back pressure of the fuel cell 1 is provided at the exhaust flow channel 32. In addition, a pressure sensor P1 for detecting an air back pressure is provided in the vicinity of the back pressure valve 34. A flow rate sensor F1 for detecting an air supply flow rate to the fuel cell 1 is provided at the compressor 33.

The hydrogen piping system 400 is responsible for supplying hydrogen gas to and discharging hydrogen gas from the fuel cell 1, and includes a hydrogen supply source 40, a supply flow channel 41, a circulatory flow channel 42, a shut valve 43, and the like. After hydrogen gas from the hydrogen supply source 40 is depressurized by a regulator 44, a flow rate and pressure of the hydrogen gas are regulated with high accuracy by an injector 45. Subsequently, hydrogen gas merges with a hydrogen off-gas force-fed by a hydrogen pump 46 on the circulatory flow channel 42 at a confluence A to be supplied to the fuel cell 1. A purge channel 47 with a purge valve 48 is branchingly connected to the circulatory flow channel 42. The hydrogen off-gas is discharged to the exhaust flow channel 32 by opening the purge valve 48. A pressure sensor P2 that detects a supply pressure of hydrogen gas to the fuel cell 1 is provided on a downstream-side of the confluence A. In addition, a flow rate sensor F2 is provided on the hydrogen pump 46. Moreover, in other embodiments, a fuel off-gas may be introduced to a hydrogen diluter or a gas-liquid separator may be provided at the circulatory flow channel 42.

The coolant piping system 500 is responsible for circulating a coolant (for example, cooling water) to the fuel cell 1, and includes a cooling pump 50, a coolant flow channel 51, a radiator 52, a bypass flow channel 53, and a switching valve 54. The cooling pump 50 force-feeds a coolant inside the coolant flow channel 51 into the fuel cell 1. The coolant flow channel 51 includes a temperature sensor T1 located on a coolant inlet-side of the fuel cell 1 and a temperature sensor T2 located on a coolant outlet-side of the fuel cell 1. The radiator 52 cools the coolant discharged from the fuel cell 1. The switching valve 54 is made of, for example, a rotary valve and switches coolant conduction between the radiator 52 and the bypass flow channel 53 as required.

The controller 600 is configured as a microcomputer internally provided with a CPU, a ROM, and a RAM. Detected information from the sensors (P1, P2, F1, F2, T1, and T2) that detect pressure, temperature, flow rate, and the like of fluids flowing through the respective piping systems 300, 400, and 500 are inputted to the controller 600. In addition, detected information of a current sensor 61 that detects a value of a current generated by the fuel cell 1, as well as detected information from an external air temperature sensor 62, a vehicle speed sensor 63, an accelerator opening sensor (not shown), and the like, are inputted to the controller 600. In response to such detected information and the like, the controller 600 controls the various devices (the compressor 33, the shut valve 43, the injector 45, the hydrogen pump 46, the purge valve 48, the cooling pump 50, the switching valve 54, and the like) in the system 100 so as to integrally control operations of the fuel cell system 100. Furthermore, the controller 600 reads various detected information, and estimates a water content of the fuel cell 1 using various maps stored in the ROM.

As illustrated in FIG. 7, the controller 600 includes a storage unit 65, a detecting unit 66, an estimating unit 67, and an operation control unit 68 as function blocks for estimating the water content of the fuel cell 1 and realizing control based on the estimation. The storage unit 65 stores various programs and various maps for estimating a water content of the fuel cell 1 and realizing control of the fuel cell 1. The maps are to be obtained in advance by experiment or simulation. The detecting unit 66 reads detected information of the various sensors (P1, P2, F1, F2, T1, T2, and 61 to 63) and the like. Based on an estimation result by the estimating unit 67, the operation control unit 68 transmits control instructions to the various devices and controls operation so as to place the fuel cell 1 in a desired operational state (for example, a water condition, a temperature condition, or the like). At this point, as required, the operation control unit 68 executes control that distinguishes between the anode side and the cathode side.

Based on the information acquired by the detecting unit 66, the estimating unit 67 references the various maps in the storage unit 65 to estimate a water content of the fuel cell 1.

More specifically, the estimating unit 67 estimates a residual water content distribution and a moisture content distribution in a cell plane of the single cell 2 while taking into consideration water transfer that occurs between the electrodes 24A and 24B via the electrolyte membrane 23. In addition, the estimating unit 67 also estimates a residual water content distribution and a moisture content distribution of each single cell 2 in a lamination direction (hereinafter, referred to as cell lamination direction).

Here, "in a cell plane" refers to the inside of a single cell 2 in a planar direction (a direction parallel to a plane of paper of FIG. 4 and perpendicular to the cell lamination direction) of the single cell 2. "Residual water content" refers to an amount of liquid water existing in the reactant gas flow channel of the single cell 2. "Reactant gas flow channel" is a concept that collectively designates the hydrogen flow channel 25A and the air flow channel 25B. "Moisture content" refers to an amount of water contained in the electrolyte membrane 23 of the single cell 2.

C. Estimation Method of Water Content of Fuel Cell

A water content estimation method according to the present embodiment involves separately estimating a residual water content and a moisture content and, in doing so, estimating a residual water content distribution separately for the anode side and the cathode side. In addition, distributions of a residual water content and a moisture content in the cell lamination direction are estimated in addition to distributions in a cell plane. Hereinafter, firstly, an estimation method of water distribution (a residual water content distribution and a moisture content distribution) in a cell plane will be described. Subsequently, a description will be given on how temperature variation and flow distribution variation in the cell lamination direction are considered during estimation, followed by a description on a water distribution estimation method in the cell lamination direction.

1. Estimation Method of Water Distribution in a Cell Plane

As illustrated in FIG. 8, firstly, a current value I, a cell inlet temperature $T_{in, i}$, a cell outlet temperature $T_{OUT, i}$, an air flow rate $Q_{air, i}$, a hydrogen flow rate $Q_{H2, i}$, an air back pressure $P_{air, i}$, and a hydrogen pressure $P_{H2, i}$ are read (step S1).

Here, the current value I is a value detected by the current sensor 61. The subscript "i" in cell inlet temperature $T_{in, i}$ and the like designates the cell channel indicating a position of the single cell 2 in the cell laminate 3. More specifically, in a case where the cell laminate 3 illustrated in FIG. 9 is taken as a model, a cell channel "i" of an end cell 2a nearest to the supply port (corresponding to the supply ports 11a and 12a in FIG. 1) and the exhaust (corresponding to the exhausts 11b and 12b in FIG. 1) of the reactant gas takes a value of 1. In a case where 200 single cells 2 are laminated, the cell channel "i" of the other end cell 2a takes a value of 200.

The cell inlet temperature $T_{in, i}$ and the cell outlet temperature $T_{OUT, i}$ respectively indicate coolant temperatures at the coolant inlet 29a and the coolant outlet 29b of the single cell 2 (cell channel: i). The air flow rate $Q_{air, i}$ and the hydrogen flow rate $Q_{H2, i}$ respectively indicate supply flow rates of air and hydrogen gas which flow into the air inlet 28a and the hydrogen inlet 27a of the single cell $2_i$. The air back pressure $P_{air, i}$ and the hydrogen pressure $P_{H2, i}$ respectively indicate pressures of air and hydrogen gas at the air outlet 28b and the hydrogen inlet 27a of the single cell $2_i$. The following applies in a case where the fuel cell has only one single cell 2 or in a case where temperature variation and flow distribution variation in the cell lamination direction are not considered.

$T_{in, i}$: detected value by the temperature sensor T1
$T_{OUT, i}$: detected value by the temperature sensor T2
$Q_{air, i}$: detected value by the flow rate sensor F1
$Q_{H2, i}$: is hydrogen supply flow rate calculated from a detected value by the flow rate sensor F2
$P_{air, i}$: detected value by the pressure sensor P1
$P_{H2, i}$: detected value by the pressure sensor P2

On the other hand, in a case where the fuel cell 1 includes a plurality of single cells 2, heat discharge, pressure drop, and the like differ depending on positions in the cell lamination direction. Therefore, a heat discharge variation and flow distribution variations of the reactant gas and the coolant exist among the single cells 2. Accordingly, a cell inlet temperature $T_{in, i}$ and the like which take the above into consideration are desirably used. The method of consideration will be described later.

Values from sensors other than those described above or values calculated by other calculation methods may be used as the respective detected values used as the cell inlet temperature $T_{in, i}$ and the like. In other words, a temperature sensor, a flow rate sensor, and a pressure sensor may be provided at positions other than those illustrated in FIG. 6 and design changes to the numbers and positions thereof may be performed as appropriate. For example, a hydrogen flow rate sensor may be provided near the hydrogen supply port 11a of the fuel cell 1 and a detected value of the sensor be used as the hydrogen flow rate $Q_{H2, i}$. In addition, the cell inlet temperature $T_{in, i}$, and the cell outlet temperature $T_{OUT, i}$ can also be estimated by mounting temperature sensors to the end cell 2a or the end-plates 7a, 7b. As shown, by measuring a temperature of the fuel cell stack itself as opposed to a temperature of the coolant, water estimation can be performed with higher accuracy.

In step S2 illustrated in FIG. 8, a cathode inlet dew point $T_{d, CA}$ and an anode inlet dew point $T_{d, AN}$ of each single cell $2_i$ are calculated from the cell inlet temperature $T_{in, i}$. In the present embodiment, since the humidifier 30 is used in the fuel cell system 1, the cell inlet temperature $T_{in, i}$ can be used as the cathode inlet dew point $T_{d, CA}$ and the anode inlet dew point $T_{d, AN}$, respectively. In other words, in a case where the air inlet 28a and the hydrogen inlet 27a are close to the coolant inlet 29a, the following expression becomes true and a lamination variation of dew points can be taken into consideration.

$$T_{d,CA} = T_{d,AN} = T_{in,i}$$

Moreover, in step S2, the cathode inlet dew point $T_{d, CA}$ and the anode inlet dew point $T_{d, AN}$ of each single cell $2_i$ can be calculated from the cell outlet temperature $T_{out, i}$. Furthermore, in another embodiment, a dew-point meter may be used. For example, in a case where a humidifier is not used in the fuel cell system 1 or in a case where the cell inlet temperature $T_{in, i}$ is not used, dew-point meters may respectively be installed at stack inlets (the anode-side supply port 11a and the cathode-side supply port 12a) of the fuel cell 1 and the detected values of the dew-point meters be set as the cathode inlet dew point $T_{d, CA}$ and the anode inlet dew point $T_{d, AN}$. Such a configuration enables estimation with higher accuracy.

In addition, in an air non-humidification system in which the humidifier 30 is not mounted on the air piping system 300, the cathode inlet dew point $T_{d, CA}$ may be calculated as being 0° C. Alternatively, the cathode inlet dew point $T_{d, CA}$ may be calculated by a function of external air temperature and external humidity using an external air temperature sensor and an external humidity sensor. In other words, the present estimation method can also be applied to a non-humidification system.

In step S3 illustrated in FIG. 8, a water transfer rate $V_{H2O, CA \to AN}$ between the electrodes 24A, 24B is determined. The water transfer rate $V_{H2O, CA \to AN}$ is calculated as follows.

$$V_{H2O,CA \to AN} = D_{H2O} \times (P_{H2O,CA} - P_{H2O,AN})$$

In the above expression, $P_{H2O, CA}$ is a water vapor partial pressure on the side of the electrode 24B of the single cell $2_i$ and is calculated from the cathode inlet dew point $T_{d, CA}$. In addition, $P_{H2O, AN}$ is a water vapor partial pressure on the side of the electrode 24A of the single cell $2_i$ and is calculated from the anode inlet dew point $T_{d, AN}$. $D_{H2O}$ denotes water diffusivity in the electrolyte membrane 23. While a constant value can be used as $D_{H2O}$, since variances occur due to humidity, such variances are desirably taken into consideration.

For example, a characteristic map representing a relationship between a relative humidity of the electrolyte membrane 23 and $D_{H2O}$ such as that illustrated in FIG. 10 may be created in advance, and using the characteristic map, a value of $D_{H2O}$ corresponding to the relative humidity of the electrolyte membrane 23 may be used. More specifically, a value (β) of $D_{H2O}$ to be used in an upcoming estimation can be determined from the map using a relative humidity α of the electrolyte membrane 23 estimated upon shutdown of a previous operation of the fuel cell 1, a relative humidity α of the electrolyte membrane 23 estimated during a downtime (suspension) of the fuel cell 1, or a relative humidity α of the electrolyte membrane 23 estimated at the fuel cell 1 immediately before the upcoming estimation.

In step S4 illustrated in FIG. 8, a current density $i_x$ (where x is any natural number) is calculated using a map from the water transfer rate $V_{H2O, CA \to AN}$, the dew point $T_{d, CA}$, the dew point $T_{d, AN}$, the temperature $T_{OUT, i}$, the air back pressure $P_{air, i}$, the hydrogen pressure $P_{H2, i}$, the air flow rate $Q_{air, i}$, the hydrogen flow rate $Q_{H2, i}$, and the current value I. The current density $i_x$ is a current density over an arbitrary area in the cell plane. For example, if respective areas for x=4 are to be denoted as $s_1$ to $s_4$, then $I = i_1 \times s_1 + i_2 \times s_2 + i_3 \times s_3 + i_4 \times s_4$. An example of a calculation result of a distribution of the current density $i_x$ is illustrated in FIG. 11.

In addition, a current distribution and a relative humidity distribution in a cell plane are calculated in step S4. Functions I and RH which represent the distributions may be expressed as follows. Moreover, sensitivities of the functions I and RH with respect to each parameter ($T_{d, CA}$, $T_{d, AN}$, $T_{OUT, i}$, $P_{air, i}$, $P_{H2, i}$, $Q_{air, i}$, $Q_{H2, i}$, $V_{H2O, CA \to AN}$, $i_x$) are to be mapped in advance. In addition, an overvoltage distribution in the cell plane may also be calculated based on the parameters.

$$I = f(T_{d,CA}, T_{d,AN}, T_{OUT,i}, P_{air,i}, P_{H2,i}, Q_{air,i}, Q_{H2,i}, V_{H2O, CA \to AN}, i_x)$$

$$RH = f(T_{d,CA}, T_{d,AN}, T_{OUT,i}, P_{air,i}, P_{H2,i}, Q_{air,i}, Q_{H2,i}, V_{H2O, CA \to AN}, i_x)$$

FIG. 12 is a diagram illustrating an example of relative humidity distributions (relative humidity distributions of the reactant gas flow channel and the electrolyte membrane) in a cell plane calculated in step S4. In the present embodiment, a counterflow flow channel mode is taken as an example so that flows of hydrogen gas and air are shown in relation to a position in a cell plane in FIG. 12. As illustrated in FIG. 12, while relative humidity has exceeded 100% and is in a supersaturated state from the hydrogen inlet 27a to the hydrogen outlet 27b in an AN flow channel (the hydrogen flow channel 25A), relatively humidity is below 100% on the side of the air outlet 28b in a CA flow channel (the air flow channel 25B). In addition, a central part (a central part of the single cell 2) of the electrolyte membrane 23 is in a supersaturated state.

In step S5 illustrated in FIG. 8, a degree of supersaturation $\sigma_1$ (an amount corresponding to relative humidity over 100%) and a degree of undersaturation $\sigma_2$ (an amount corresponding to relative humidity under 100%) are respectively calculated for the anode side and the cathode side from the relative humidity distribution result illustrated in FIG. 12, and a liquid water generation rate $V_{vap \to liq}$ and a liquid water evaporation rate $V_{liq \to vap}$ are calculated from the expressions given below. $V_{vap \to liq}$ and $V_{liq \to vap}$ in the hydrogen flow channel 25A and the air flow channel 25B are respectively calculated in consideration of the fact that phases (gas phase, liquid phase) of water vary in the reactant gas flow channel.

$$V_{vap \to liq} = k_1 \times \sigma_1$$

$$V_{liq \to vap} = k_2 \times \sigma_2$$

In the above expressions, coefficients $k_1$, $k_2$ represent factors due to temperature and water repellency and attributable to properties of the reactant gas flow channel. The coefficients $k_1$, $k_2$ are to be mapped in advance from an experiment.

In step S6 illustrated in FIG. 8, a water transfer rate V_liq in the reactant gas flow channel is respectively calculated for the anode side and the cathode side from the following expression. Respective water transfer rates V_liq in the hydrogen flow channel 25A and the air flow channel 25B are calculated in consideration of the fact that liquid water is blown away and discharged from inside the cell plane by the flow of reactant gas in the reactant gas flow channel.

$$V\_liq = k_3 \times V\_gas$$

In this case, the water transfer rate V_liq refers to a transfer rate of liquid water blown away by the reactant gas. In addition, V_gas denotes a water vapor flow rate in the reactant gas flow channel. A value calculated from a map related to a state quantity such as a supply flow rate of reactant gas and water vapor partial pressure is to be used. The coefficient $k_3$ represents a factor due to temperature or water repellency and attributable to properties of the reactant gas flow channel. The coefficient $k_3$ is to be mapped in advance from an experiment.

FIG. 13 is a diagram illustrating an example of a residual water content distribution in a cell plane calculated in steps S4 to S6. The residual water content distribution is determined by taking into consideration the variation of liquid water in the reactant gas flow channel (in other words, $V_{vap \to liq}$, $V_{liq \to vap}$, and V_liq calculated in steps S5 and S6 described above) in addition to the relative humidity distribution (FIG. 12) in the reactant gas flow channel calculated in step S4. As can be understood from FIG. 13, in the hydrogen flow channel 25A, the residual water content is higher on the side of the hydrogen outlet 27b than the side of the hydrogen inlet 27a, and in the air flow channel 25B, the residual water content gradually drops toward the side of the air outlet 28b. Moreover, although not diagrammatically illustrated, a moisture content distribution in a cell plane can be determined from the relative humidity distribution (FIG. 12) of the electrolyte membrane 23 calculated in step S4 and is to approximate the relative humidity distribution.

From the procedure described above, variations (water balance) in a residual water content and a moisture content of a single cell $2_i$ in a given calculation time can be calculated and a residual water content distribution of the hydrogen flow channel 25A, a residual water content distribution of the air flow channel 25B, and a moisture content distribution of the electrolyte membrane 23 can be determined. Water balance in a cell plane can be calculated based on a coarseness of a mesh with sensitivity (for example, the five meshes illustrated in FIG. 13). Accordingly, how much residual water content and moisture content exist in which portion can be estimated with high accuracy.

2. Consideration of Temperature Variation and Flow Distribution Variation in Cell Lamination Direction During Estimation $T_{IN, i}$, $T_{OUT, i}$, $P_{air, i}$, $P_{H2, i}$, $Q_{air, i}$, and $Q_{H2, i}$ of each single cell $2_i$ are to be determined as follows.

(1) Calculation of Cell Inlet Temperature $T_{IN, i}$

As illustrated in FIG. 14, first, a stack inlet temperature $T_{in}$, a coolant flow rate $Q_{LLC}$, an external air temperature $T_{external\ air}$, and a vehicle speed $V_{vehicle\ speed}$ are read (step S11). In this case, $T_{in}$ is a detected value by the temperature sensor T1. $Q_{LLC}$ is a flow rate of the coolant to be supplied to the fuel cell 1 and can be estimated from the number of revolutions of the cooling pump 50 and other detected values. Alternatively, a flow rate sensor may be provided at the coolant flow channel 51 and a detected value by the flow rate sensor may be used. $T_{external\ air}$ is a detected value by the external air temperature sensor 62 and $V_{vehicle\ speed}$ is a detected value by the vehicle speed sensor 63.

Generally, in the cell laminate 3, the further away from the supply port 14 of the reactant gas or, in other words, the greater the cell channel "i," the greater the heat discharge. In addition, the influence of heat discharge varies depending on the coolant flow rate, the external air temperature, and the vehicle speed. For example, as illustrated in FIG. 15A, the greater the coolant flow rate $Q_{LLC}$ ($Q_1 > Q_2$), the less the stack inlet temperature $T_{IN}$ is influenced by heat discharge. In other words, the cell inlet temperature $T_{IN, i}$ can be prevented from dropping below the stack inlet temperature $T_{IN}$. In addition, as illustrated in FIG. 15B, the higher the $T_{external\ air}$ ($T_{external\ air\ 1} > T_{external\ air\ 1}$), the less the stack inlet temperature $T_{IN}$ is influenced by heat discharge.

Therefore, in consideration of such declines in coolant temperature due to heat discharge, the cell inlet temperature $T_{IN, i}$ is to be calculated as a function expressed as follows (step S12).

$$T_{IN,i} = f(Q_{LLC}, T_{IN}, T_{external\ air}, V_{vehicle\ speed})$$

Accordingly, a cell inlet temperature $T_{IN, i}$ corresponding to the cell channel i can be calculated from the respective values of $Q_{LLC}$, $T_{IN}$, $T_{external\ air}$, and vehicle speed described above.

(2) Calculation of Air Flow Rate $Q_{air, i}$ and Air Back Pressure $P_{air, i}$ As illustrated in FIG. 16, first, an air flow rate $Q_{air}$, an air back pressure $P_{air}$, a stack inlet temperature $T_{IN}$, a stack outlet temperature $T_{OUT}$, and a current value I are read (step S21). In this case, the air flow rate $Q_{air}$, the air back pressure $P_{air}$, and the stack outlet temperature $T_{OUT}$ are respective detected values of the flow rate sensor F1, the pressure sensor P1, and the temperature sensor T2. In addition, in step S21, a gas density of air that flows into the manifold 15a is calculated as a function of the stack inlet temperature $T_{IN}$ and the air flow rate $Q_{air}$.

In the following step S22, a P-Q characteristic (a characteristic representing a relationship between air back pressure and air flow rate) of a single cell $2_i$ is determined based on the residual water content of the single cell $2_i$. For example, a map representing a P-Q characteristic (pressure-flow rate characteristic) corresponding to a plurality of residual water contents (x>y) such as that illustrated in FIG. 17 is to be acquired in advance, and a P-Q characteristic corresponding to an immediately previous residual water content (a total amount of the cathode-side residual water content of the single cell $2_i$) calculated by the flow illustrated in FIG. 8 is determined.

Next, a cell inlet pressure distribution, a cell inflow flow rate distribution, and a cell outlet pressure distribution are calculated from a map as functions of the air flow rate $Q_{air}$, the air back pressure $P_{air}$, the stack outlet temperature $T_{OUT}$, the gas density calculated above, and the P-Q characteristic of each single cell $2_i$ (step S23). An example of the distributions are as illustrated in FIGS. 18A to 18C. In this case, since the cell inflow flow rate illustrated in FIG. 18B and the cell outlet pressure illustrated in FIG. 18C correspond to an air flow rate $Q_{air, i}$ and an air back pressure $P_{air, i}$ of the cell channel i, respective values thereof can be determined (step S24).

Moreover, although a detailed description will not be given, a hydrogen flow rate $Q_{H2, i}$ and a hydrogen pressure $P_{H2, i}$ of the single cell $2_i$ can also be calculated by the same method as used for the calculations of the air flow rate $Q_{air, i}$ and the air back pressure $P_{air, i}$. In this case, since the cell inlet pressure illustrated in FIG. 18A corresponds to the hydrogen pressure $P_{H2, 1}$ and the cell inflow flow rate illustrated in FIG. 18B corresponds to the hydrogen flow rate $Q_{H2, i}$, respective values thereof can be determined.

(3) Calculation of Cell Outlet Temperature $T_{OUT, i}$

As illustrated in FIG. 19, first, a stack outlet temperature $T_{OUT}$ is read as a detected value of the temperature sensor T2 (step S31). In addition, a coolant flow rate $Q_{LLC}$, an external air temperature $T_{external\ air}$, and a vehicle speed $V_{vehicle\ speed}$ are read in the same manner as in the case of the stack inlet temperature $T_{IN}$ described above. Furthermore, a cell voltage $V_i$ and a current value I are read, and a heat generation amount $Q_{cell, i}$ of each single cell $2_i$ is estimated from an I-V characteristic of each single cell $2_i$.

In this case, a voltage value of each single cell $2_i$ detected by a cell monitor, not illustrated, can be used as the cell voltage $V_i$. However, instead of using a sensor such as a cell monitor, the cell voltage $V_i$ can also be estimated by having each single cell $2_i$ retain an I-V map (dependent on an electric-generating capacity, an air flow rate, a hydrogen flow rate, an air back pressure, and a hydrogen pressure). Moreover, the heat generation amount $Q_{cell, i}$ is attributable to heat generation by $T\Delta S$ and heat loss due to overvoltage.

In the same manner as the stack inlet temperature $T_{IN}$ described above, the stack outlet temperature $T_{OUT}$ is also influenced by heat discharge depending on the position of the single cell $2_i$ in the cell laminate 3. For example, as illustrated in FIG. 20, the greater the coolant flow rate $Q_{LLC}$ ($Q_{LLC1} < Q_{LLC2}$), the less the stack outlet temperature $T_{OUT}$ is influenced by heat discharge.

Therefore, the coolant flow rate $Q_{LLC, i}$ and heat discharge are taken into consideration in addition to the heat generation amount $Q_{cell, i}$, and the cell outlet temperature $T_{OUT, i}$ is to be calculated as a function expressed as follows (step S32).

$$T_{OUT,i} = f(Q_{cell,i}, Q_{LLC,i}, T_{OUT}, T_{external\ air}, V_{vehicle\ speed})$$

Accordingly, a cell outlet temperature $T_{OUT, i}$ corresponding to the cell channel i can be calculated from respective detected values or estimated values represented by the parameters.

Moreover, $Q_{LLC, i}$ is a coolant flow rate to be supplied to each single cell 2 and takes into consideration a flow distribution variation with respect to the coolant flow rate $Q_{LLC}$ described earlier in a case where a single fuel cell stack 1 is assumed. More specifically, by creating in advance a map representing a relationship between the coolant flow rate $Q_{LLC}$ and the cell channel i for each of several coolant flow rates $Q_{LLC}$, a $Q_{LLC, i}$ corresponding to the cell channel i can be calculated.

According to the procedures (1) to (3) described above, values that take into consideration a temperature distribution (a variation in heat discharge or the like) and pressure drop distribution (flow distribution variations of oxidation gas, fuel gas, coolant, or the like) can be used for state quantities of each single cell $2_i$ in the flows (steps S1, S2, and S4) illustrated in FIG. 8. Accordingly, compared to a case where the fuel cell 1 is singularly perceived as a stack, a residual water content distribution and a moisture content distribution can be estimated with high accuracy for all single cells 2 (in other words, in a cell lamination direction).

D. Control Example Using Estimation Results

Next, a control example using results of estimation by the aforementioned estimation method will be described. The present control example is capable of using highly accurate estimation results to change a content of an intermittent operation of the fuel cell 1 and suppress deterioration due to cell voltage reduction while taking into consideration a water distribution of the fuel cell 1.

Here, an intermittent operation refers to an operation involving suspending power generation by the fuel cell 1 during a light-load condition (during idling and the like) at which system efficiency of the fuel cell 1 is reduced. More specifically, during an intermittent operation, operations of auxiliaries (such as the compressor 33, the injector 45, and the hydrogen pump 46) which supply hydrogen gas and air to the electrodes 24A and 24B are suspended and, at the same time, power generation by the fuel cell 1 is suspended. In addition, a drive force and auxiliary power for a fuel cell vehicle which are required during the intermittent operation are to be supplied from an auxiliary power source such as a secondary cell, not illustrated. The storage unit 65 of the controller 600 described above stores a mode for performing an intermittent operation, a mode for a normal operation during which an intermittent operation is not performed, and the like. The operation control unit 68 switches, as required, from the normal operation mode to the intermittent operation mode to execute an intermittent operation. Hereinafter, a plurality of examples of changing a content of an intermittent operation according to the present control example will be described.

1. First Control Example (Prohibition of Intermittent Operation)

The first control example changes a content of intermittent operation by prohibiting the same.

As illustrated in FIG. 21, first in step S101, respective residual water content distributions of the hydrogen flow channel 25A and the air flow channel 25B as well as a moisture content distribution of all single cells 2 are estimated according to the estimation method described above. The estimation is executed by the estimating unit 67. Next, a judgment is made on whether or not the estimated residual water content is equal to or greater than a threshold (step S102). The judgment is made by the operation control unit 68.

When the estimated residual water content is lower than the threshold (No in step S102), the operation control unit 68 permits an intermittent operation of the fuel cell 1 (step S103). This is because if the residual water content is lower than the threshold, executing the intermittent operation mode does not present a risk of cell voltage reduction after the intermittent operation. On the other hand, when the estimated residual water content is equal to or greater than the threshold (Yes in step S102), the operation control unit 68 prohibits intermittent operation (step S104).

In this case, the residual water content (estimated value) to be compared to the threshold in step S102 is the residual water content of all portions of the hydrogen flow channel 25A and the air flow channel 25B. In addition, the threshold used in the comparison differs between the side of the hydrogen gas flow channel 25A and the side of the air flow channel 25B, differs among positions of single cells 2 in the cell lamination direction, and differs among positions in the cell plane. This is because discharging characteristics of liquid water to be carried away by the flow of reactant gas differ depending on the type of reactant gas (hydrogen gas, air), differ depending on positions in the cell lamination direction, and differ depending on positions in the cell plane. This aspect will now be described in detail with reference to FIGS. 22 to 24.

As illustrated in FIG. 22, the further the position of a single cell 2 (end cell 2a) towards the back in the cell lamination direction, the harder it is for the reactant gas to flow due to a pressure drop at the manifold 15a and the like. In other words, the closer a single cell 2 is positioned towards the front in the cell lamination direction, the easier the reactant gas flows from the gas inlets (27a, 28a) to the gas outlets (28a, 28a) and the higher the discharging characteristics of liquid water. Note that the back and the front in the cell lamination direction respectively refer to a downstream side and an upstream side of the supplying direction of the reactant gas in the cell laminate 3. In addition, in a cell plane, since the closer to the side of the gas inlets (27a, 28a), the greater the distances from the gas outlets (27b, 28b), the harder it is for liquid water to be discharged. In other words, in a cell plane, the closer the accumulated liquid water is to the side of the gas outlets (28a, 28b), the easier the accumulated liquid water is discharged out of the reactant gas flow channels (25A, 25B). In FIG. 22, a counterflow flow channel mode is taken as an example so that flows of hydrogen gas and air are shown in relation to positions in a cell plane.

FIGS. 23A and 23B are diagrams which respectively illustrate relationships between a threshold to be used at a single cell 2 positioned backmost in the cell lamination direction and positions in the hydrogen flow channel 25A and the air flow channel 25B. The arrows which form horizontal axes in the drawings represent directions of flow of hydrogen gas and air in the cell plane. The flow directions are consistent with the flow directions illustrated in FIG. 22. Therefore, for example, in FIG. 23A, an intersection of the vertical axis and the horizontal axis represents the hydrogen outlet 27b, and the closer to the hydrogen outlet 27b, the greater the threshold to be used. In addition, in FIG. 23B, an intersection of the vertical axis and the horizontal axis represents the air inlet 28a, and the closer to the air outlet 28b, the greater the threshold to be used. As shown, the closer to the gas outlets (27b, 28b), the greater the threshold because accumulated liquid water can be more readily discharged as described above.

FIGS. 24A and 24B are diagrams which respectively illustrate relationships between a threshold to be used at a single cell 2 positioned foremost in the cell lamination direction and positions in the hydrogen flow channel 25A and the air flow channel 25B. In the same manner as in FIG. 23A, in FIG. 24A, an intersection of the vertical axis and the horizontal axis represents the hydrogen outlet 27b, and the closer to the hydrogen outlet 27b, the greater the threshold to be used. The same logic applies to FIG. 24B. In addition, as can be understood by comparing FIGS. 23A and 24A, with respect to the same position in the cell plane, a greater threshold is to be used towards the front in the cell lamination direction than towards the back thereof. For example, thresholds in the vicinity of the hydrogen outlet 27b have a relationship expressible as $g_{A,1} < g_{A,2}$. This is because, as described above, the closer to the front in the cell lamination direction, the easier accumulated liquid water is discharged.

As shown, the threshold to be used in step S102 is not set to a constant value. Rather, a predetermined value corresponding to a position where liquid water exists is used in consideration of discharging characteristics.

As described above, according to the first control example, since a highly accurate estimation result of water distribution is used, an intermittent operation can be prohibited with high accuracy in a case where the residual water content is high. Consequently, an increase in the residual water content which accompanies the execution of an intermittent operation can be suppressed and cell voltage reduction caused by water accumulation due to the intermittent operation can be suppressed with high accuracy. In addition, the fuel efficiency of the entire system can also be improved. Particularly, since the threshold is varied according to a location where liquid water is present as well as an amount of the liquid water, prohibition of an intermittent operation can be executed in an appropriate manner.

Note that, as illustrated in FIG. 21, the present flow returns to step S101 both after the prohibition of an intermittent operation (step S104) and the permission of an intermittent operation (step S103) and the present flow is performed.

2. Second Control Example (Scavenging Process Before Intermittent Operation)

The second control example changes a content of intermittent operation by performing a scavenging process before the intermittent operation.

As illustrated in FIG. 25, in the same manner as in steps S101 and S102 in FIG. 21, residual water content distributions and moisture content distributions of all single cells 2 are estimated (step S111), and a judgment is made on whether or not the estimated residual water content is equal to or greater than a threshold (step S112). The threshold to be used in step S112 is also the same as the threshold used in step S102 (refer to FIGS. 23A, 23B and 24A, 24B). In addition, in a similar manner, when the estimated residual water content is lower than the threshold (No in step S112), an intermittent operation is permitted without performing a scavenging process of the fuel cell 1 (step S113).

On the other hand, when the estimated residual water content is equal to or greater than the threshold (Yes in step S112), a scavenging process of the fuel cell 1 is executed (step S114). Since the residual water content is reduced by the scavenging process, after executing the scavenging process (step S114), an intermittent operation is to be permitted (step S113).

Here, the scavenging process can be performed for a given control amount and a control time. However, the mode of the scavenging process is desirably changed as appropriate while taking into consideration the water distribution of the fuel cell 1 as estimated by the estimating unit 67. Specifically, the operation control unit 68 determines a gas system on which the scavenging process is to be executed and a control amount and a control time of the scavenging process depending on at least one of a location where the residual water content equal to or greater than the threshold exists and a size of the residual water content. For example, the greater the residual water content equal to or greater than the threshold, the greater the set control amount and control time of the scavenging process. In addition, when changing modes of the scavenging process, examples of locations of residual water content to be considered include (1) anode-side and cathode-side flow channels which are targets of the scavenging process, and (2) positions in the cell lamination direction and in a cell plane.

(1) Anode-Side and Cathode-Side Flow Channels

For example, when it is estimated that a residual water content equal to or greater than a threshold is present in the hydrogen flow channel 25A, a scavenging process is executed on the hydrogen flow channel 25A. The scavenging process in this case can be performed by, for example, rotating the hydrogen pump 46 and carrying away liquid water in the hydrogen flow channel 25A by gas fed into the hydrogen flow channel 25A by the rotation of the pump. On the other hand, when it is estimated that a residual water content equal to or greater than a threshold is present in the air flow channel 25B, a scavenging process is executed on the air flow channel 25B. The scavenging process in this case can be performed by, for example, supplying air by the compressor 33 in a state where supplying of hydrogen gas to the fuel cell 1 is suspended and having the air carry away the liquid water inside the air flow channel 25B. Moreover, air back pressure can be lowered with the back pressure valve 34.

As shown, by executing a scavenging process separately for the anode side and the cathode side, a residual water content of the side (cathode side or anode side) on which the residual water content equals or exceeds a threshold can be appropriately reduced. Moreover, when a residual water content equal to or greater than the threshold has been estimated on both the anode side and the cathode side, the flow rates of hydrogen gas and air are to be increased (in other words, the stoichiometry ratio is to be increased) while holding the power generation amount of the fuel cell 1 constant. A scavenging process can also be performed by supplying an inert gas (for example, nitrogen) to the reactant gas flow channel (at least one of the hydrogen flow channel 25A, the air flow channel 25B, and both flow channels) instead of a scavenging process using reactant gas as described above.

(2) Positions in Cell Lamination Direction and in Cell Plane

As described above, the discharging characteristics of liquid water differ according to a position of a single cell 2 in the cell lamination direction or a position in a cell plane. In consideration thereof, the lower the liquid water discharging characteristics of a position where a residual water content equal to or greater than a threshold exists, the greater at least one of a control amount and a control time of a scavenging process is to be set. That is, the amount of scavenging gas to be fed into the reactant gas flow channel or the length of a scavenging time is to be increased at positions to the back in the cell lamination direction or close to the gas inlets (27a, 28a) in the cell plane. Scavenging gas refers to air from the compressor 33, hydrogen gas from the hydrogen pump 46, or an inert gas from a device not illustrated.

On the other hand, the higher the liquid water discharging characteristics of a position where a residual water content equal to or greater than a threshold exists, the lower at least one of a control amount and a control time of a scavenging process is to be set. That is, the amount of scavenging gas to be fed into the reactant gas flow channel or the length of a scavenging time is to be reduced at positions to the front in the cell lamination direction or close to the gas outlets (27b, 28b) in the cell plane. As shown, by executing a scavenging process while taking into consideration the discharging characteristics of liquid water, the efficiency of the scavenging process can be improved.

As described above, according to the second control example, since a highly accurate estimation result of water distribution is used, a scavenging process can be performed with high accuracy when the residual water content is high and the residual water content can be reduced. Consequently, since the residual water content can be suppressed from becoming excessive even when an intermittent operation permitted after a scavenging process is performed, a cell voltage reduction after the intermittent operation can be suppressed. Moreover, as illustrated in FIG. 25, the present flow returns to step S111 after the permission of an intermittent operation (step S113) and the present flow is performed.

3. Modification of Second Control Example

As illustrated in FIG. 26, the present modification is an addition of steps S125 and S126 to the flow illustrated in FIG. 25. Since steps S121 to S123 are the same as steps S111 to S113, descriptions thereof will be omitted.

Specifically, a water distribution is also estimated during the scavenging process in step S124 (step S125). The water distribution estimation is performed in the same manner as in step S101 described above by estimating respective residual water content distributions and moisture content distributions of the hydrogen flow channel 25A and the air flow channel 25B of all single cells 2. Subsequently, a judgment is made on whether or not the estimated residual water content has fallen below a threshold (step S126). The threshold to be used in step S126 is the same as the threshold used in step S102 described above.

In a case where the estimated residual water content is judged to be equal to or greater than the threshold (No in step S126), the scavenging process and the water distribution estimation are to be subsequently perfumed (steps S124 and S125). On the other hand, in a case where the estimated residual water content is judged to be lower than the threshold (Yes in step S126), the scavenging process is terminated and an intermittent operation of the fuel cell 1 is permitted (step S123).

According to the present modification, an intermittent operation can be permitted after confirming that the residual water content has been reduced by the scavenging process by a highly accurate estimation method described above. Consequently, cell voltage reduction after an intermittent operation can be suppressed more reliably than in the case illustrated in FIG. 25. In particular, the present modification is configured so as to estimate a water distribution during a scavenging process and to terminate the scavenging process based on the water distribution estimation. Therefore, unlike the second control example described above, there is no need to determine a control amount and a control time of a scavenging process according to the position of a residual water content equal to or greater than the threshold and a size of the residual water content.

Note that, in addition to the method of estimating a water distribution during a scavenging process, the following method can be executed. That is, the scavenging process is performed to a certain degree and then temporarily suspended to estimate a water distribution and judge whether or not the estimated residual water content has fallen below the threshold. As a result, in a case where the residual water content has fallen below the threshold, an intermittent operation is permitted without performing the scavenging process. On the other hand, in a case where the residual water content is equal to or greater than the threshold, a scavenging operation is once again executed and a water distribution estimation is once again performed.

4. Third Control Example (Suspension of Supply of Only One of the Reactant Gases)

The third control example involves not suspending supplying of a reactant gas to only a flow channel on which a residual water content equal to or greater than a threshold has been estimated. The present third control example changes a content of intermittent operation by permitting an intermittent operation after estimating a water distribution as compared to a case where the intermittent operation is performed uniformly without estimating a water distribution. This aspect is also shared by the first and second control examples.

The steps S131 to S133 illustrated in FIG. 27 are the same as the steps S101 to S103 illustrated in FIG. 21. In the present control example, when the estimated residual water content is equal to or greater than a threshold (Yes in step S32), reactant gas is not to be stopped only on the side of the electrode having the residual water content which is equal to or greater than the threshold (step S134). For example, when it is estimated that a residual water content equal to or greater than a threshold exists in the hydrogen flow channel 25A, supply of hydrogen gas is continued to the hydrogen flow channel 25A while supply of air to the air flow channel 25B is suspended. On the other hand, when it is estimated that a residual water content equal to or greater than a threshold exists in the air flow channel 25B, supply of air is continued to the air flow channel 25B while supply of hydrogen gas to the hydrogen flow channel 25A is suspended.

According to such a method, water can be suppressed from being newly generated by the fuel cell 1 whose power generation is suspended and, at the same time, liquid water can be discharged from a reactant gas flow channel having a residual water content equal to or greater than a threshold by supplying reactant gas. Therefore, since the residual water content equal to or greater than a threshold can be accurately reduced, an intermittent operation can be executed in a state where there is no longer a risk of the intermittent operation causing water accumulation. Accordingly, cell voltage reduction after an intermittent operation can be suppressed. Moreover, supply of only one of the reactant gases in step S134 is performed only for a given period of time and the present flow subsequently returns to step S131 to perform the present flow.

5. Fourth Control Example (Driving of Auxiliaries During Intermittent Operation)

As described above, generally, during an intermittent operation, operations of auxiliaries (such as the compressor 33, the injector 45, and the hydrogen pump 46) which supply hydrogen gas and air to the electrodes 24A and 24B are suspended. The fourth control example changes a content of an intermittent operation by operating anode-side auxiliaries even during the intermittent operation while suspending power generation by the fuel cell 1.

The steps S141 and S142 illustrated in FIG. 28 which are the same as the steps S101 and S102 illustrated in FIG. 21 are to be performed during an intermittent operation. As a result of step S142, when the estimated residual water content is lower than a threshold (No in step S142), circulation of hydrogen gas to the anode electrode 24A is to remain suspended (step S143). In other words, the fuel cell 1 is kept in a state where both air and hydrogen gas are not supplied.

On the other hand, when the estimated residual water content is equal to or greater than the threshold (Yes in step S142), circulation of hydrogen gas during an intermittent operation is to be performed (step S144). In other words, the hydrogen pump 46 is driven so as to perform a circulating operation process for resupplying a hydrogen off-gas to the anode electrode 24A. At this point, the hydrogen gas from the hydrogen supply source 40 is not supplied to the anode electrode 24A and only the hydrogen off-gas is to be circulatingly supplied to the anode electrode 24A. The circulating operation process enables liquid water to be discharged from inside the hydrogen flow channel 25A and the residual water content to be reduced. Moreover, the circulating operation process in step S144 favorably involves opening the purge valve 48 at a predetermined timing and discharging liquid water carried away by the hydrogen off-gas.

In this case, driving of the hydrogen pump 46 in step S144 may involve driving by ON/OFF. However, in the same manner as the scavenging process described earlier in regards to step S114, the method (control amount, control time) of driving the hydrogen pump 46 is favorably varied depending on at least one of a location where a residual water content equal to or greater than the threshold exists and a size of the residual water content. An example thereof will now be described with reference to FIG. 29.

In FIG. 29, a vertical axis represents a control amount (i.e., the number of revolutions) of the hydrogen pump 46 and a horizontal axis represents a control time (i.e., a duration of rotating) of the hydrogen pump 46. Curves $L_1$ to $L_3$ in FIG. 29 represent control lines of the hydrogen pump 46 to be used during a circulating operation process depending on a position and a size of a residual water content equal to or greater than a threshold. The control line $L_3$ is used when the residual water content equal to or greater than a threshold is relatively high, while the control line $L_1$ is used when the residual water content equal to or greater than a threshold is relatively low. In addition, the control line $L_3$ is used when the position where the residual water content equal to or greater than a threshold is towards the back in the cell lamination direction or near the gas inlets (27a, 28a) in the cell plane. Conversely, the control line $L_1$ is used when the position where a residual water content equal to or greater than a threshold exists and has high liquid water discharging characteristics. By driving the hydrogen pump 46 according to such a method, the efficiency of the circulating operation process can be improved and fuel efficiency loss can be minimized. Moreover, in a different example, only one of a control amount and a control time of the hydrogen pump 46 can be varied.

As described above, according to the fourth control example, since a highly accurate estimation result of water distribution is used, a highly accurate circulating operation process can be performed in a case where the residual water content is high during an intermittent operation. Accordingly, since the residual water content can be reduced, cell voltage reduction due to water accumulation after an intermittent operation can be suppressed. The fourth control example is advantageous in a case where liquid water has accumulated in the hydrogen flow channel 25A. As a modification of the fourth example, the compressor 33 can be driven during an intermittent operation in a case where the estimated residual water content is equal to or greater than a threshold.

BRIEF DESCRIPTION OF THE DRAWINGS

FIG. 6 is a configuration diagram of a fuel cell system according to the embodiment;

FIG. 14 is a flow chart illustrating a method of calculating a cell inlet temperature according to the embodiment;

FIG. 15A is a diagram illustrating a relationship between single cell position and coolant flow rate with respect to the influence of heat discharge on a stack inlet temperature according to the embodiment;

FIG. 15B is a diagram illustrating a relationship between single cell position and external air temperature with respect to the influence of heat discharge on the stack inlet temperature according to the embodiment;

DESCRIPTION OF SYMBOLS

Figure 1:
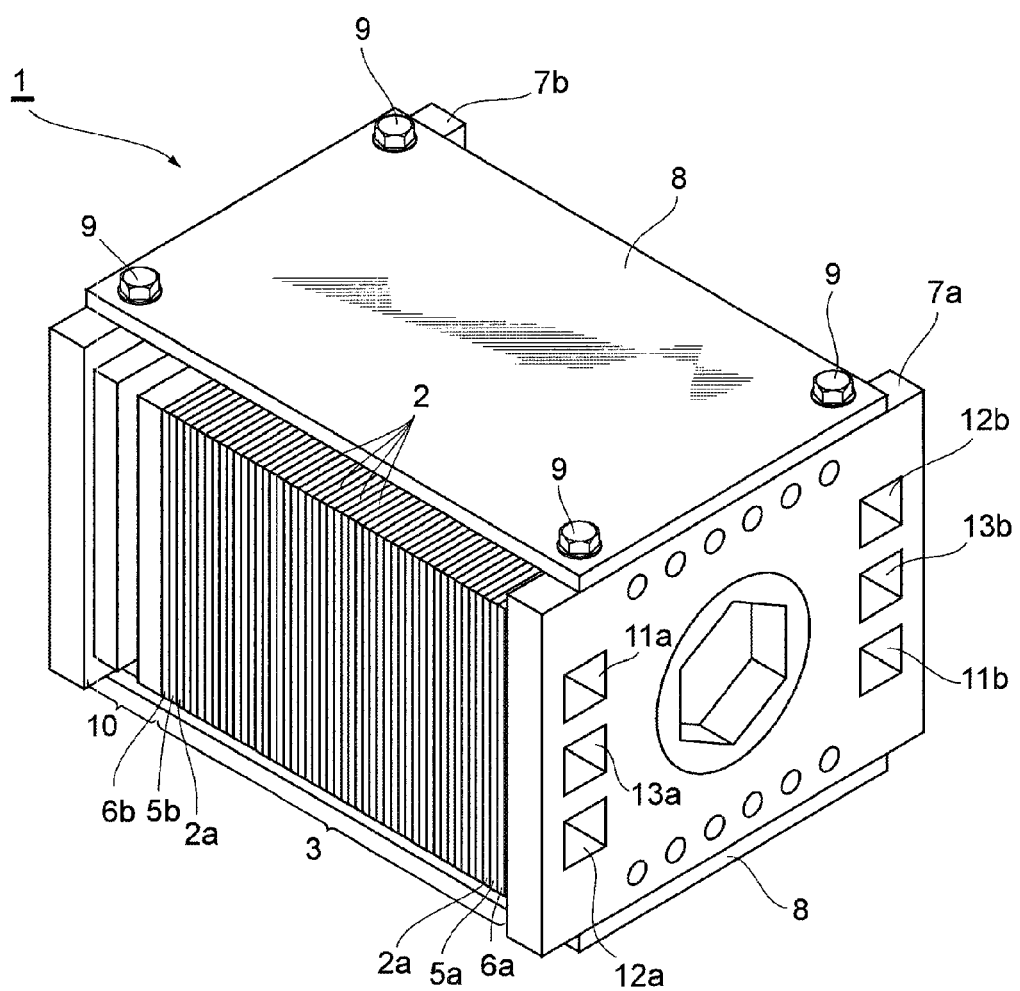
FIG. 1 is a perspective view of a fuel cell according to an embodiment.
Figure 2:
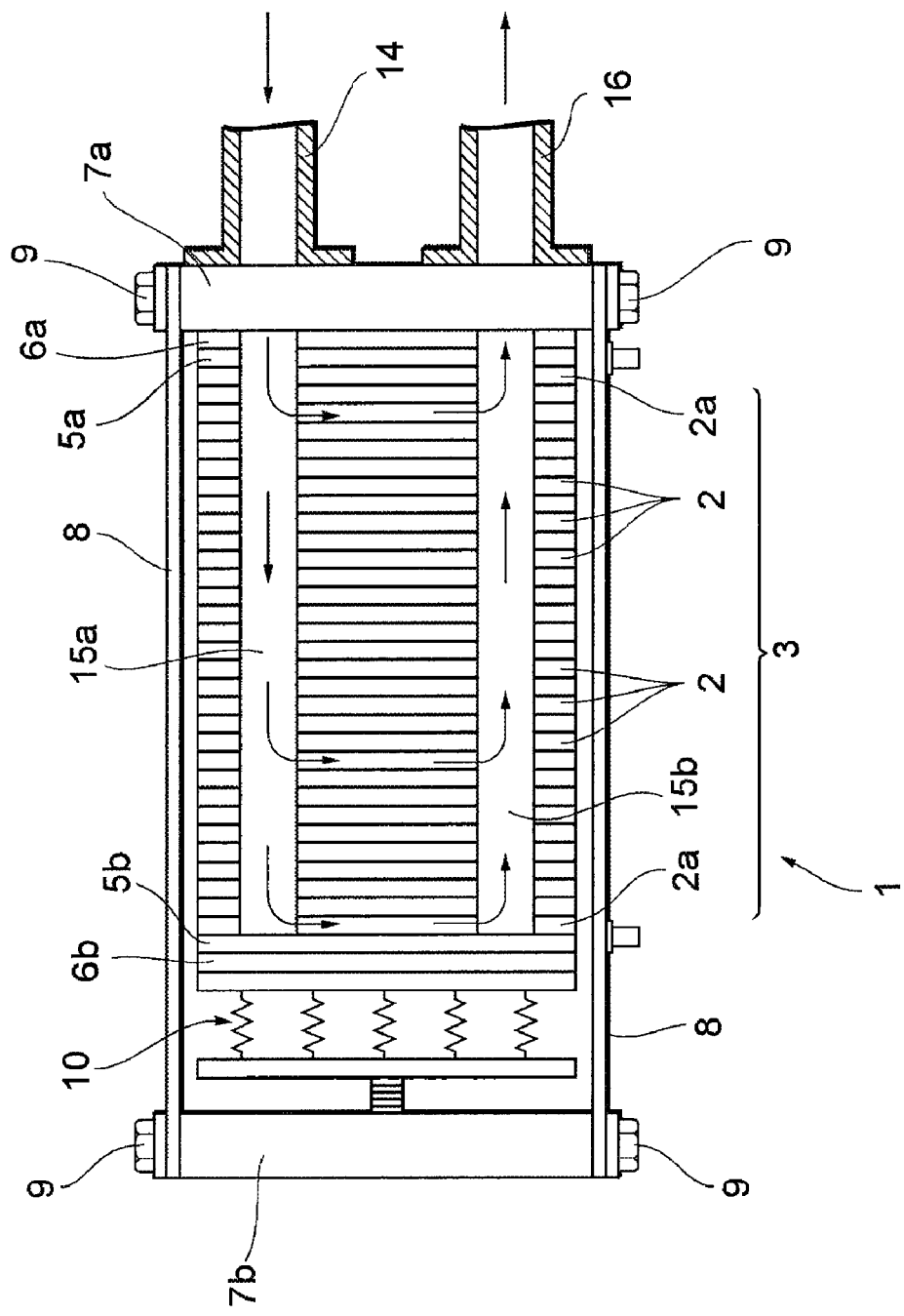
FIG. 2 is a side view of a part of an interior of the fuel cell according to the embodiment.
Figure 3:
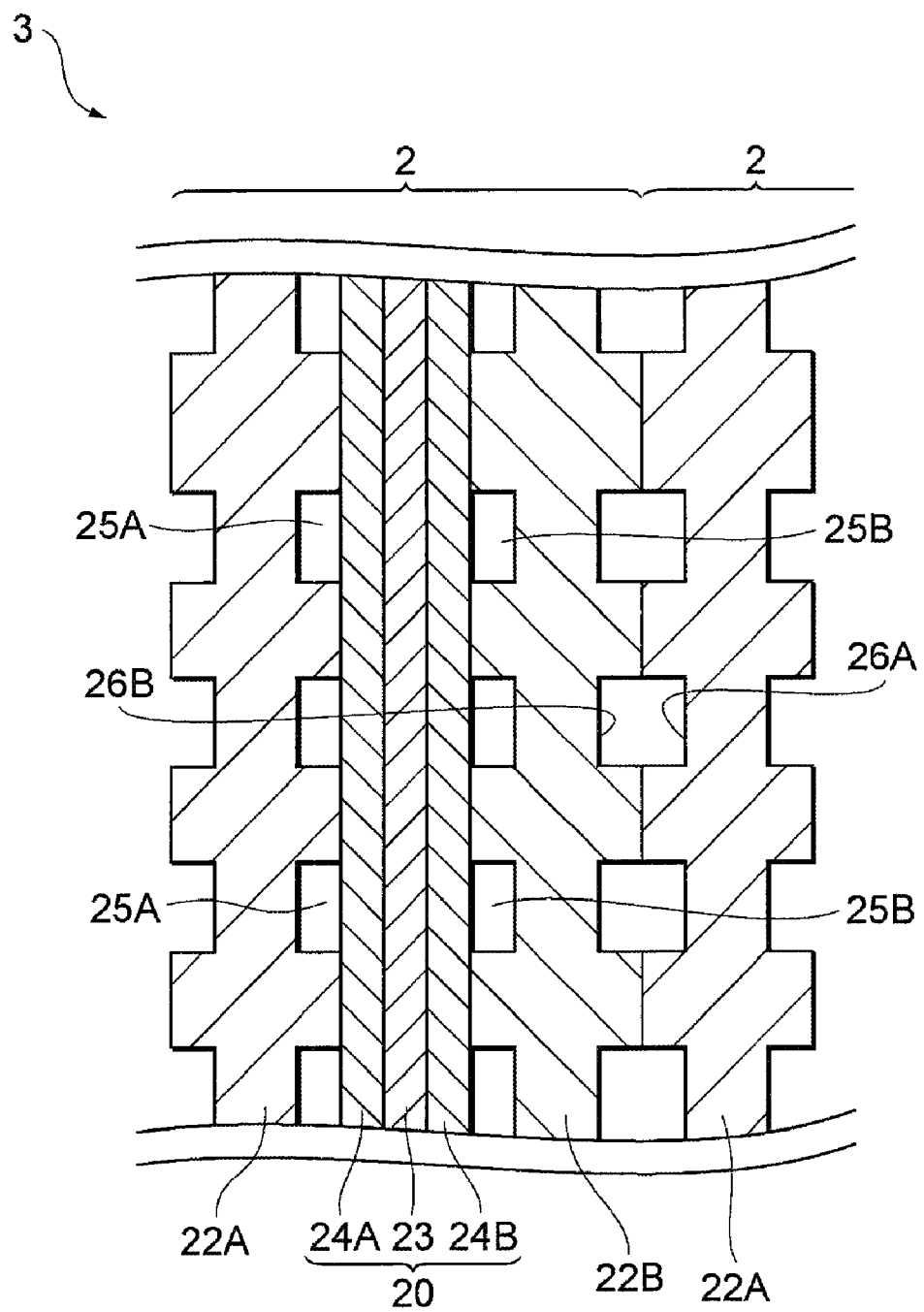
FIG. 3 is a cross-sectional view of a single cell according to the embodiment.
Figure 4:
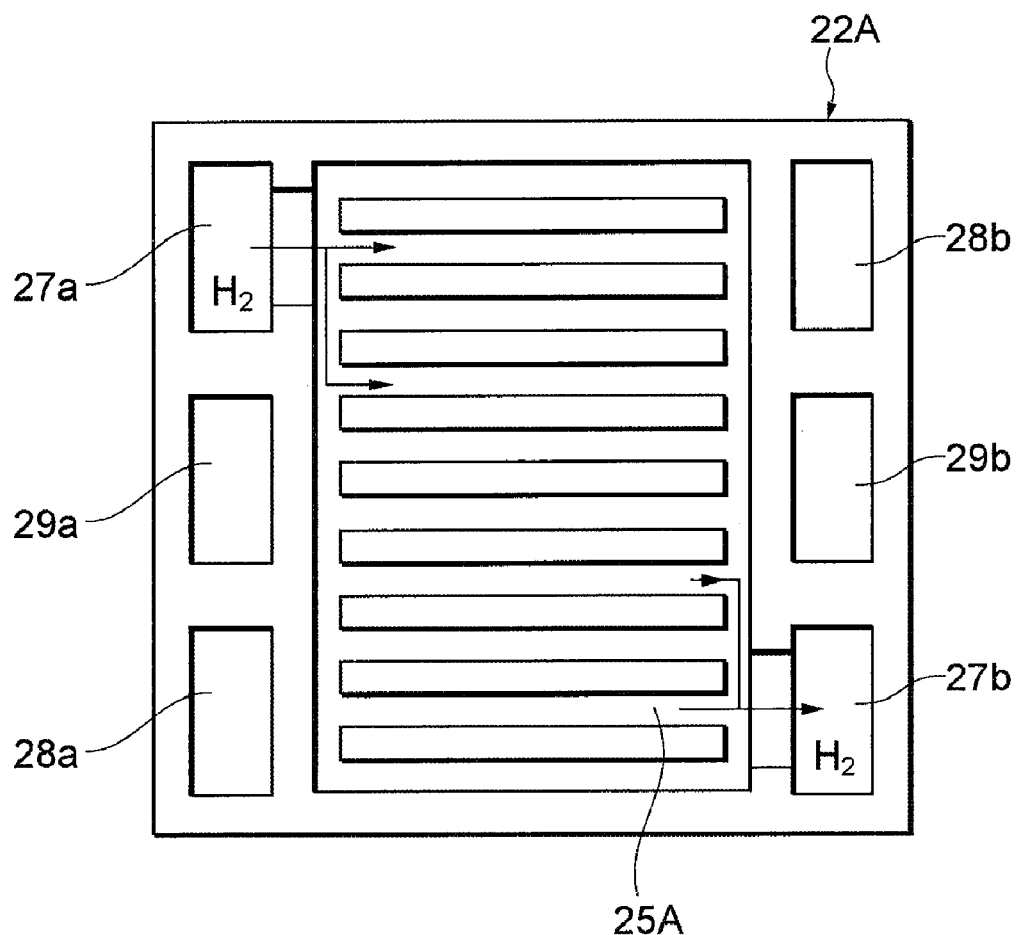
FIG. 4 is a plan view of a separator according to the embodiment.
Figure 5A:
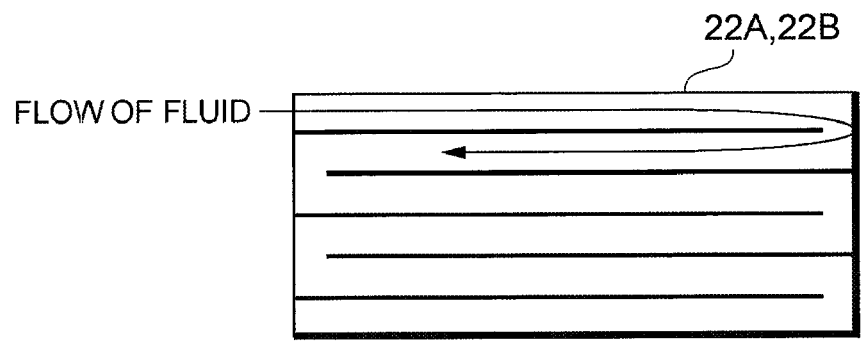
FIG. 5A is a schematic plan view illustrating a flow channel geometry of a separator according to a first modification of the embodiment.
Figure 5B:
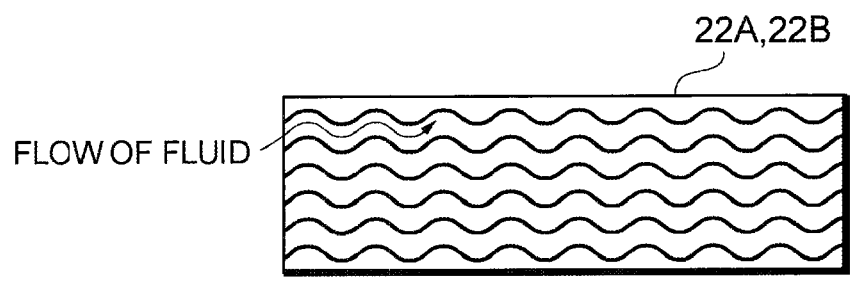
FIG. 5B is a schematic plan view illustrating a flow channel geometry of a separator according to a second modification of the embodiment.
Figure 5C:
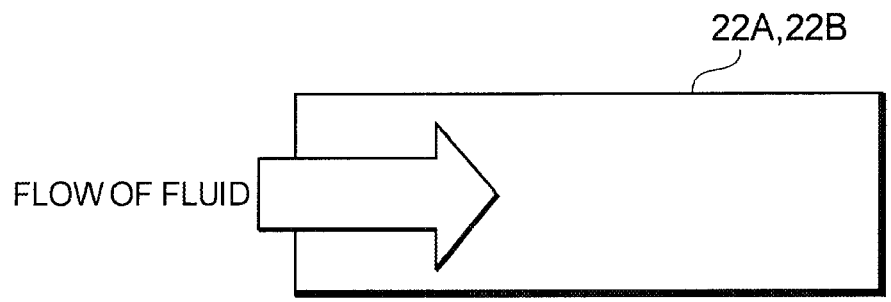
FIG. 5C is a schematic plan view illustrating a flow channel geometry of a separator according to a third modification of the embodiment.
Figure 7:
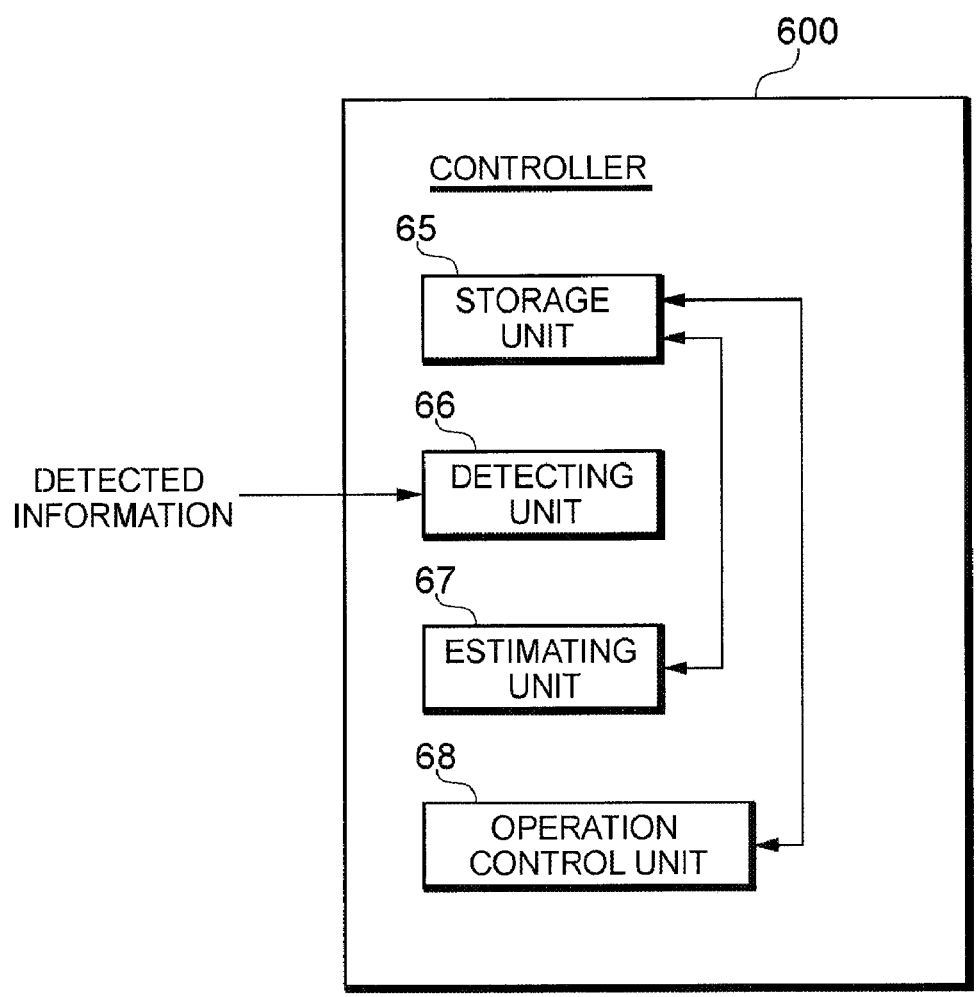
FIG. 7 is a functional block diagram of a controller according to the embodiment.
Figure 8:
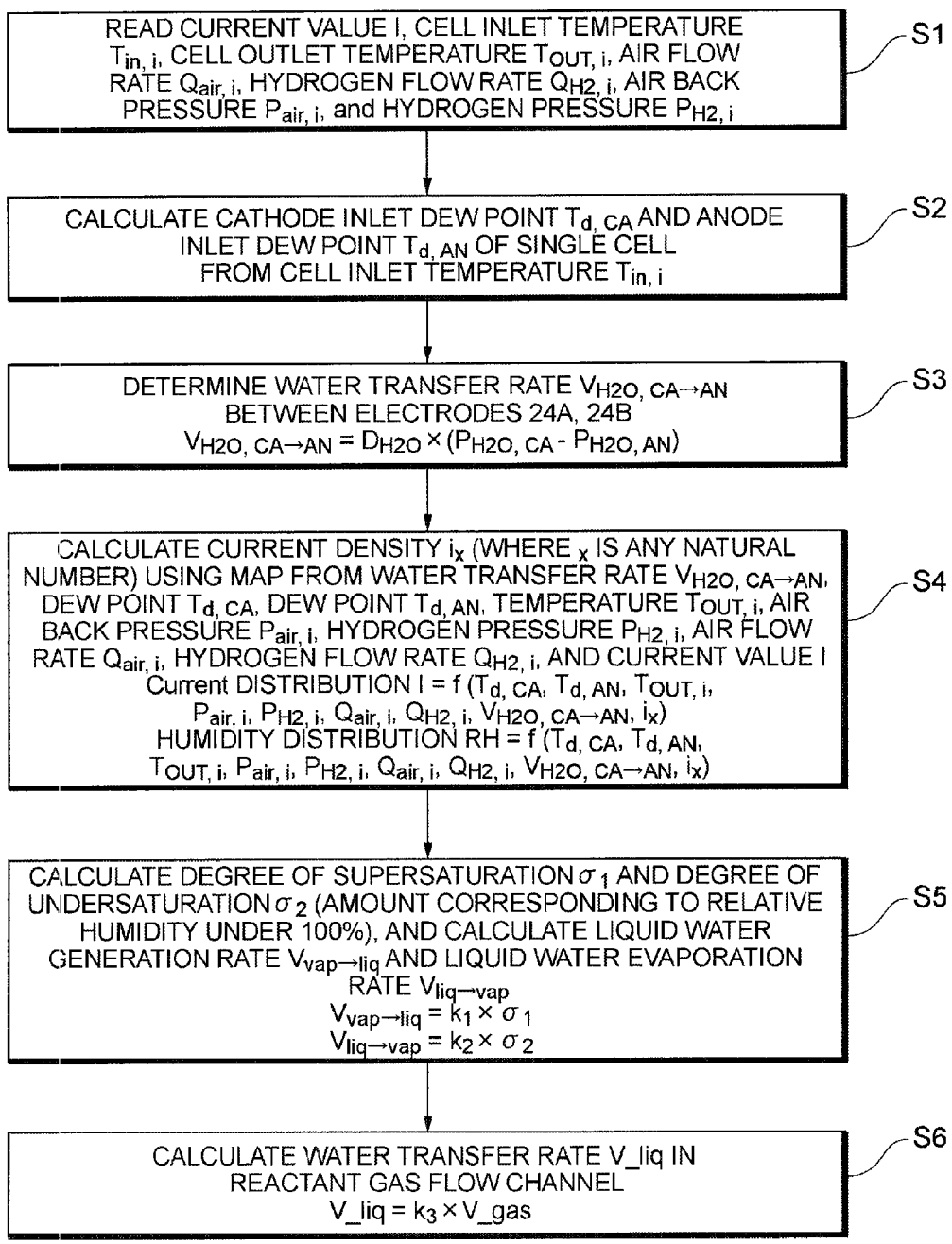
FIG. 8 is a flow chart illustrating a method of estimating water distribution in a cell plane according to the embodiment.
Figure 9:
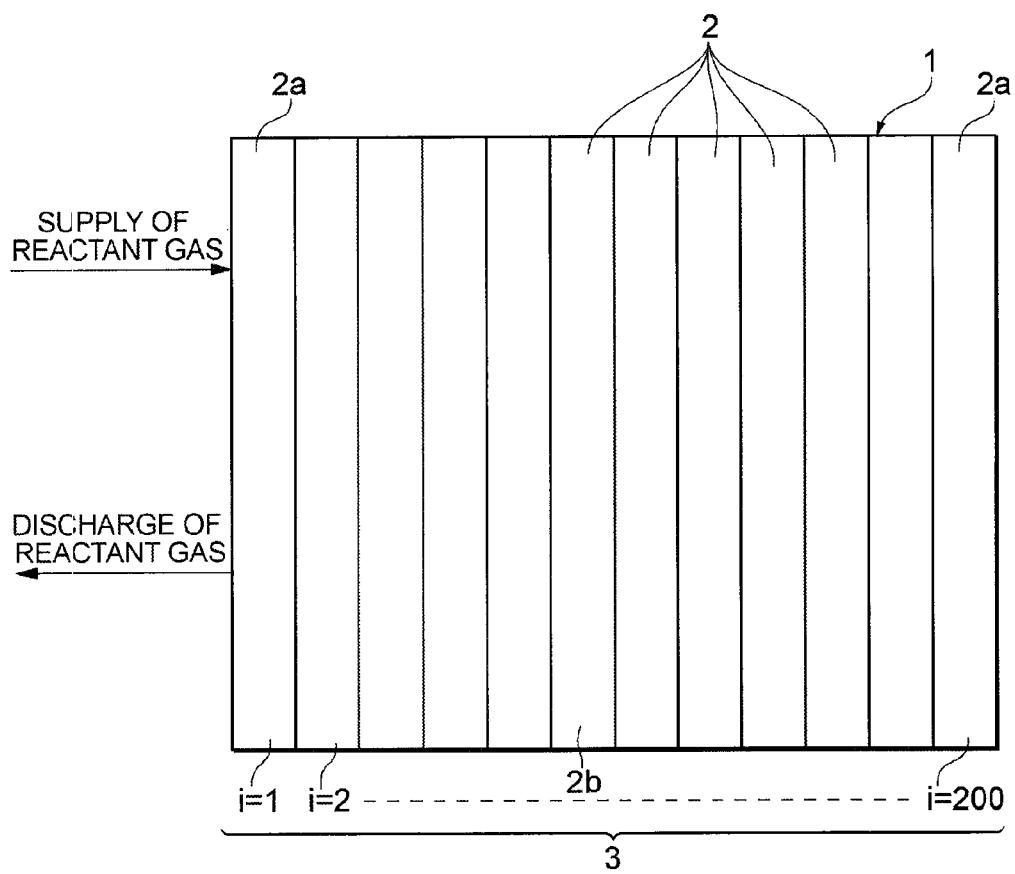
FIG. 9 is a diagram illustrating a relationship between supply and discharge of a reactant gas and a cell channel with respect to a cell laminate according to the embodiment.
Figure 10:
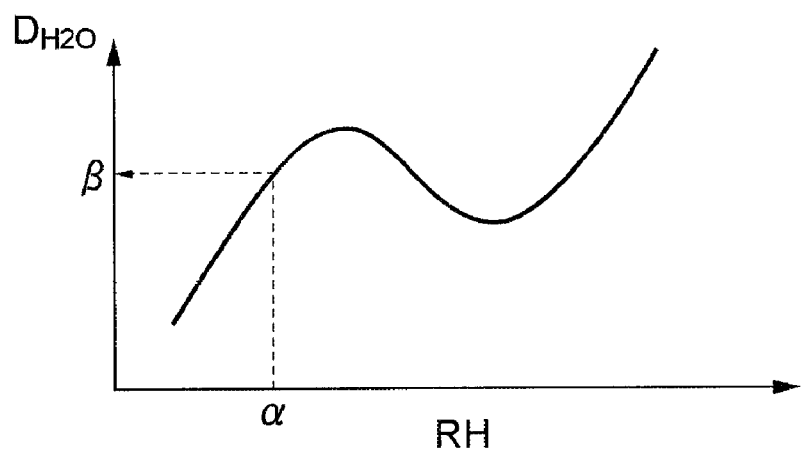
FIG. 10 is a characteristic map representing a relationship between relative humidity of an electrolyte membrane and $D_{H2O}$ according to the embodiment.
Figure 11:
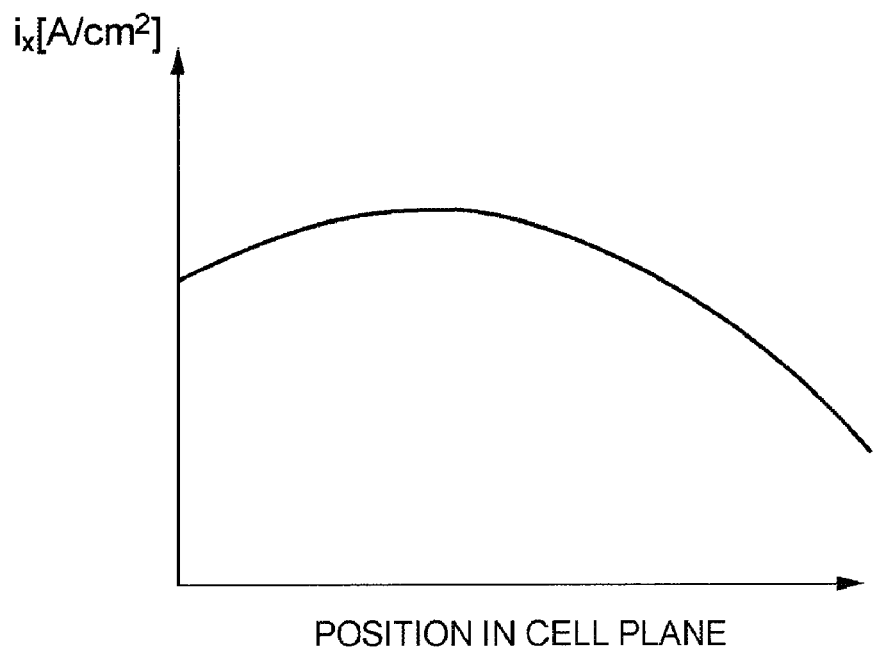
FIG. 11 is a diagram illustrating current density with respect to positions in a cell plane according to the embodiment.
Figure 12:
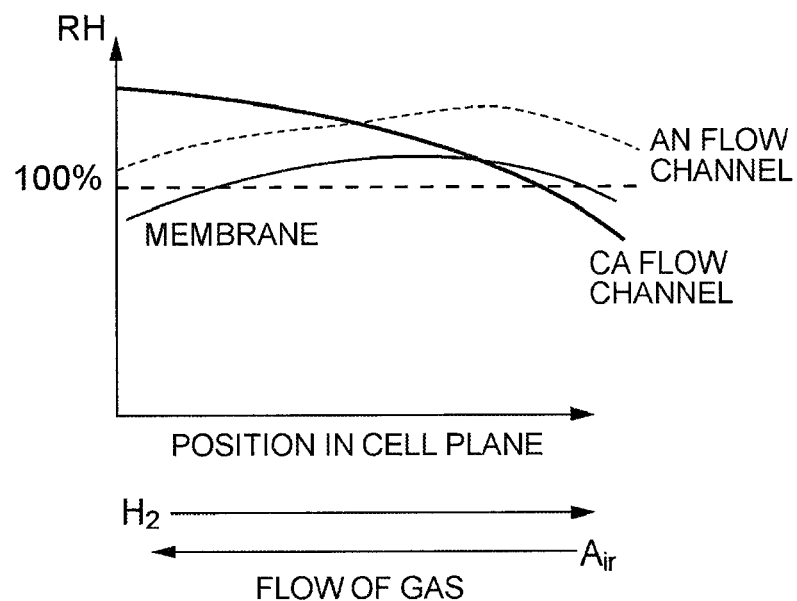
FIG. 12 is a diagram illustrating relative humidity distributions of a reactant gas flow channel and the electrolyte membrane in a cell plane according to the embodiment.
Figure 13:
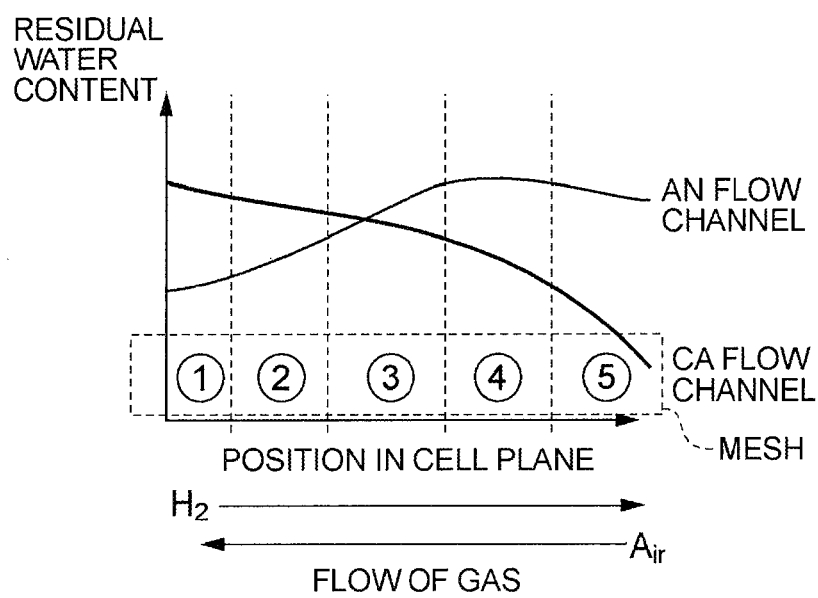
FIG. 13 is a diagram illustrating a residual water content distribution in a cell plane according to the embodiment.
Figure 16:
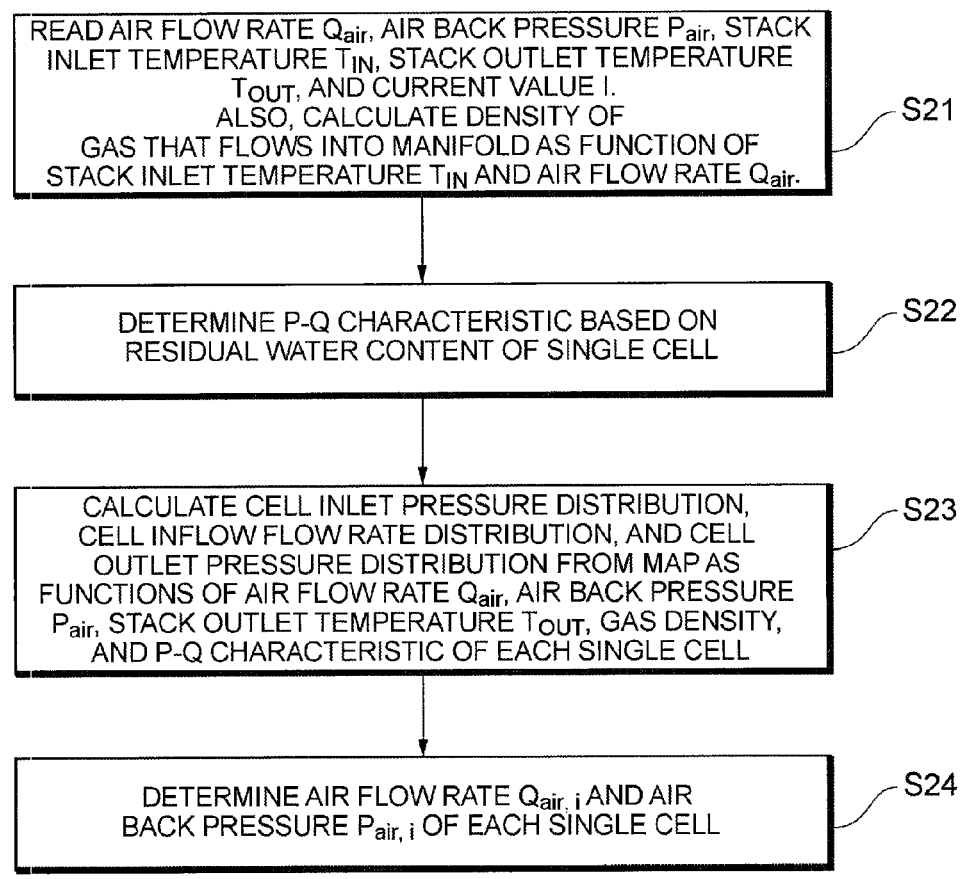
FIG. 16 is a flow chart illustrating a method of calculating an air flow rate and an air back pressure for each single cell according to the embodiment.
Figure 17:
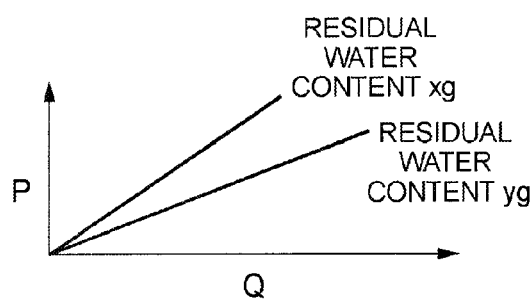
FIG. 17 is a map illustrating a P-Q characteristic of a single cell corresponding to a residual water content according to the embodiment.
Figure 18A:
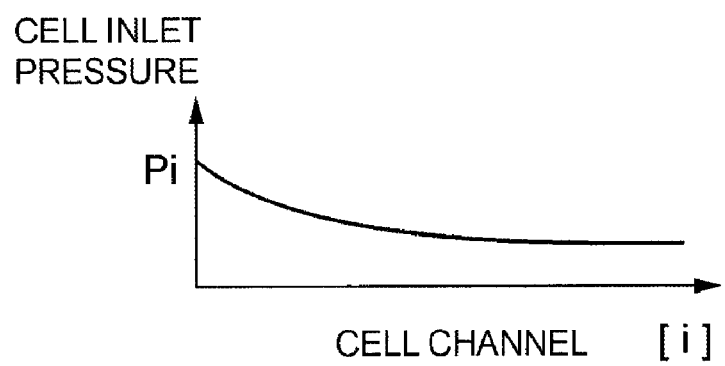
FIG. 18A is a diagram illustrating a cell inlet pressure distribution according to the embodiment.
Figure 18B:
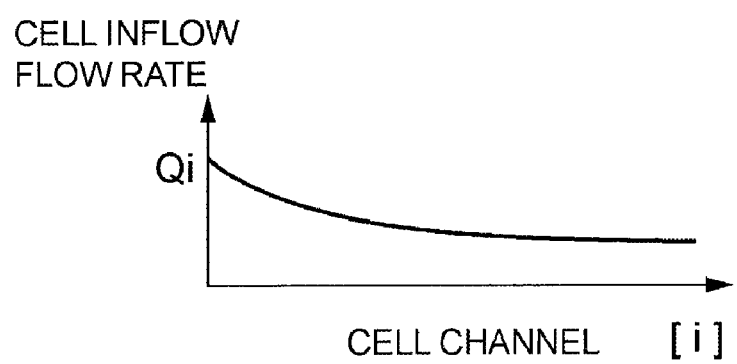
FIG. 18B is a diagram illustrating a cell inflow flow rate distribution according to the embodiment.
Figure 18C:
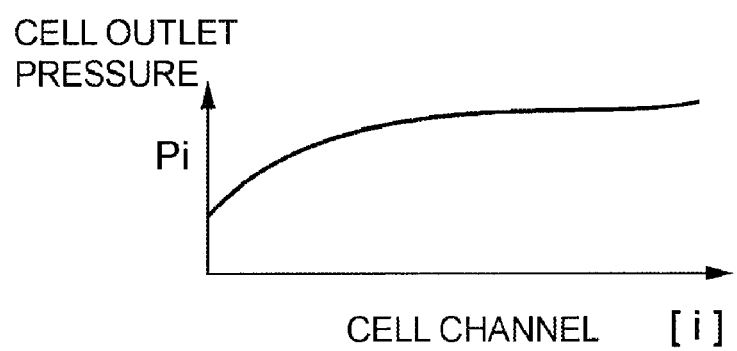
FIG. 18C is a diagram illustrating a cell outlet pressure distribution according to the embodiment.
Figure 19:
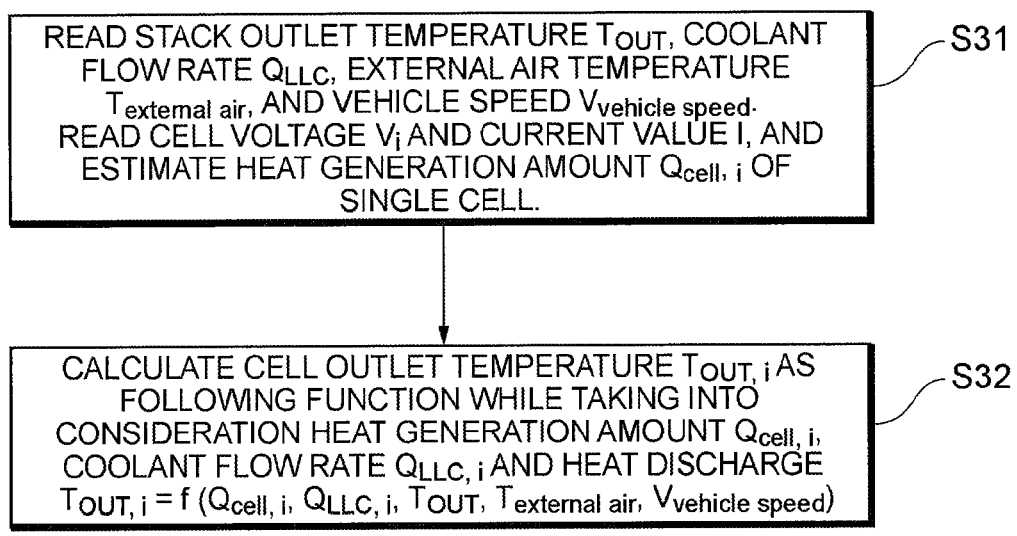
FIG. 19 is a flow chart illustrating a method of calculating a cell outlet temperature according to the embodiment.
Figure 20:
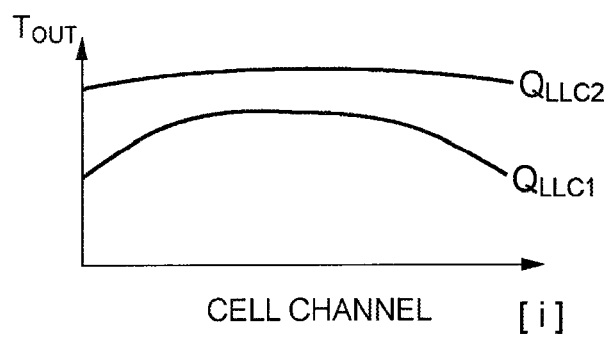
FIG. 20 is a diagram illustrating a relationship between single cell position and coolant flow rate with respect to the influence of heat discharge on a stack outlet temperature according to the embodiment.
Figure 21:
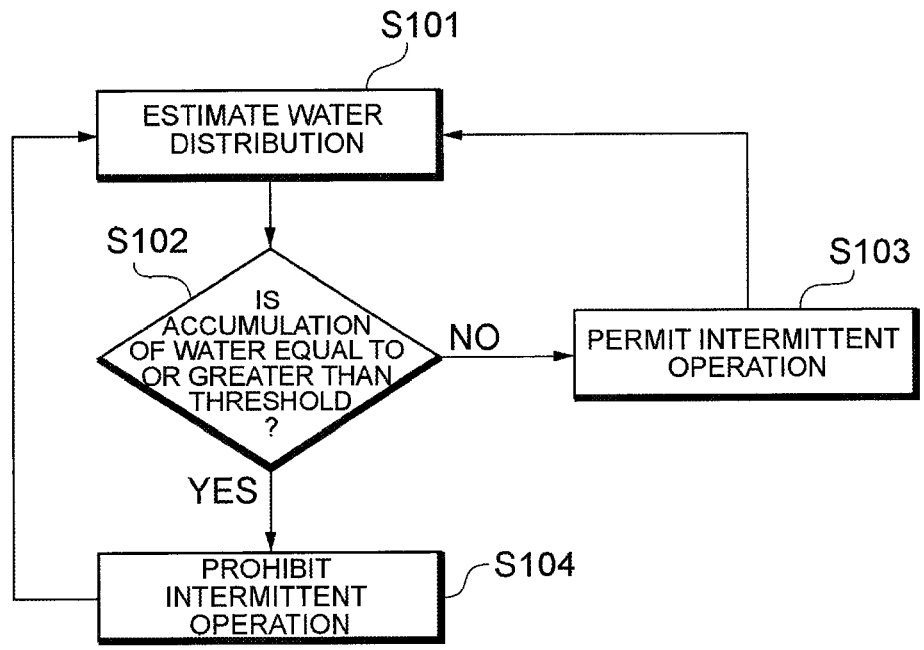
FIG. 21 is a flow chart illustrating a prohibition flow of intermittent operation according to a first control example of the embodiment.
Figure 22:
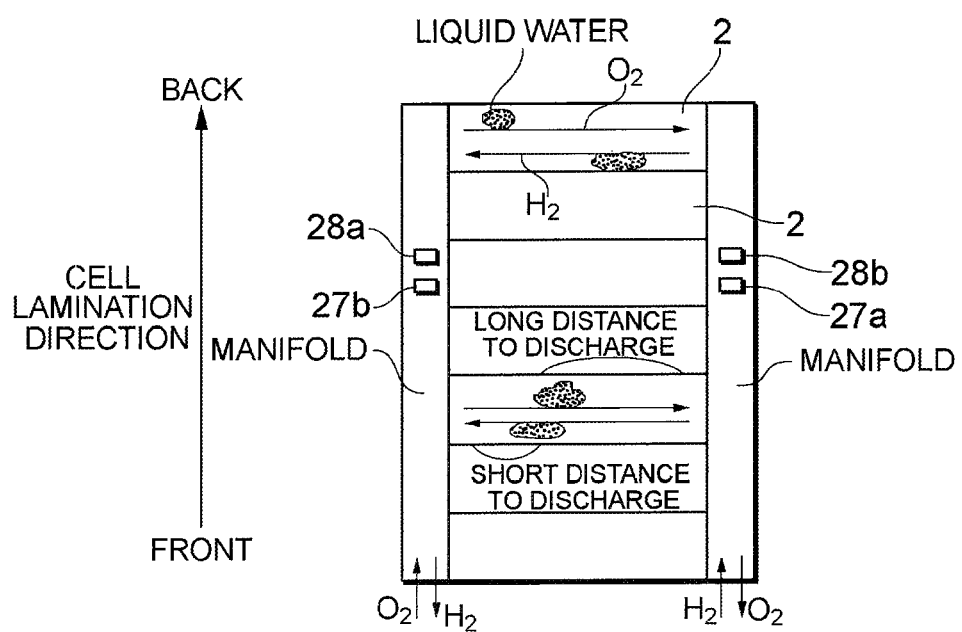
FIG. 22 is a diagram schematically illustrating a flow of reactant gas and liquid water in a cell laminate according to the embodiment.
Figure 23A:
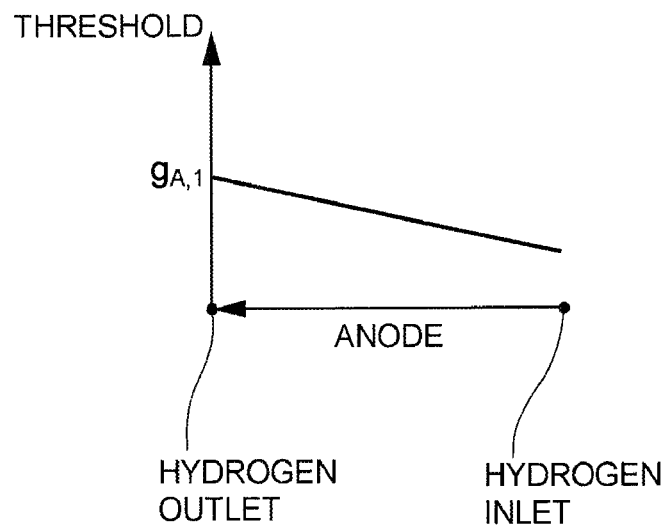
FIG. 23A is a diagram illustrating a relationship between a threshold to be used for optimizing current limiting and positions to the back in a cell lamination direction in an oxidation gas flow channel according to the embodiment.
Figure 23B:
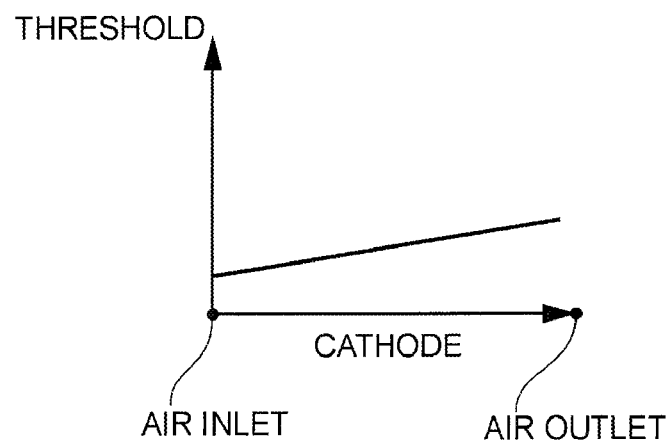
FIG. 23B is a diagram illustrating a relationship between a threshold to be used for optimizing current limiting and positions to the back in the cell lamination direction in a fuel gas flow channel according to the embodiment.
Figure 24A:
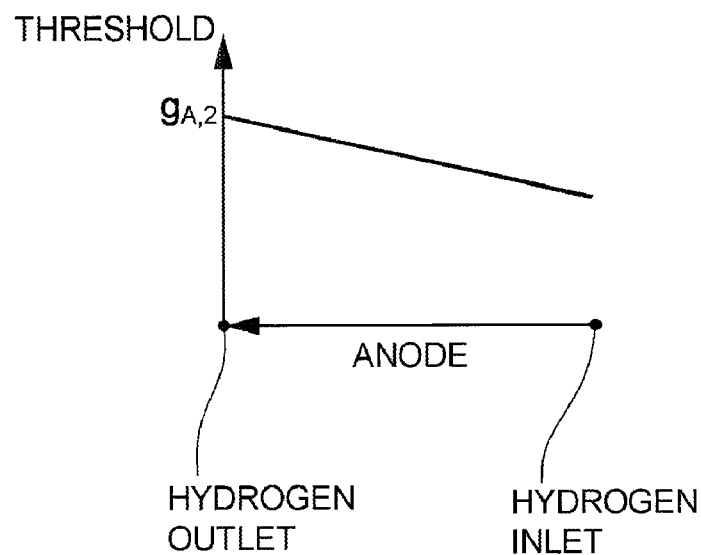
FIG. 24A is a diagram illustrating a relationship between a threshold to be used for optimizing current limiting and positions to the front in the cell lamination direction in the oxidation gas flow channel according to the embodiment.
Figure 24B:
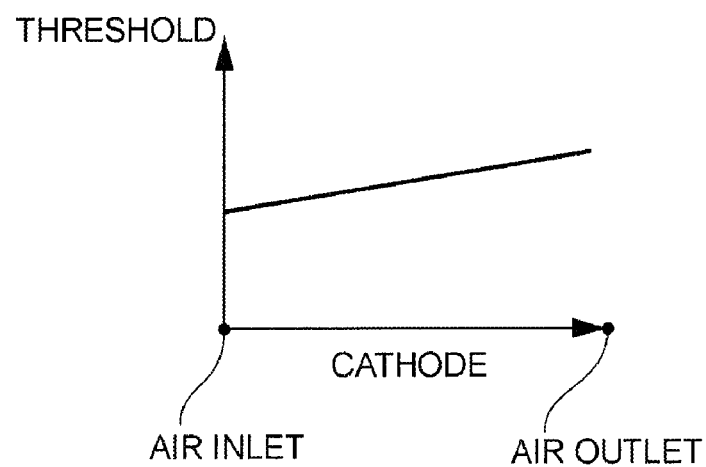
FIG. 24B is a diagram illustrating a relationship between a threshold to be used for optimizing current limiting and positions to the front in the cell lamination direction in the fuel gas flow channel according to the embodiment.
Figure 25:
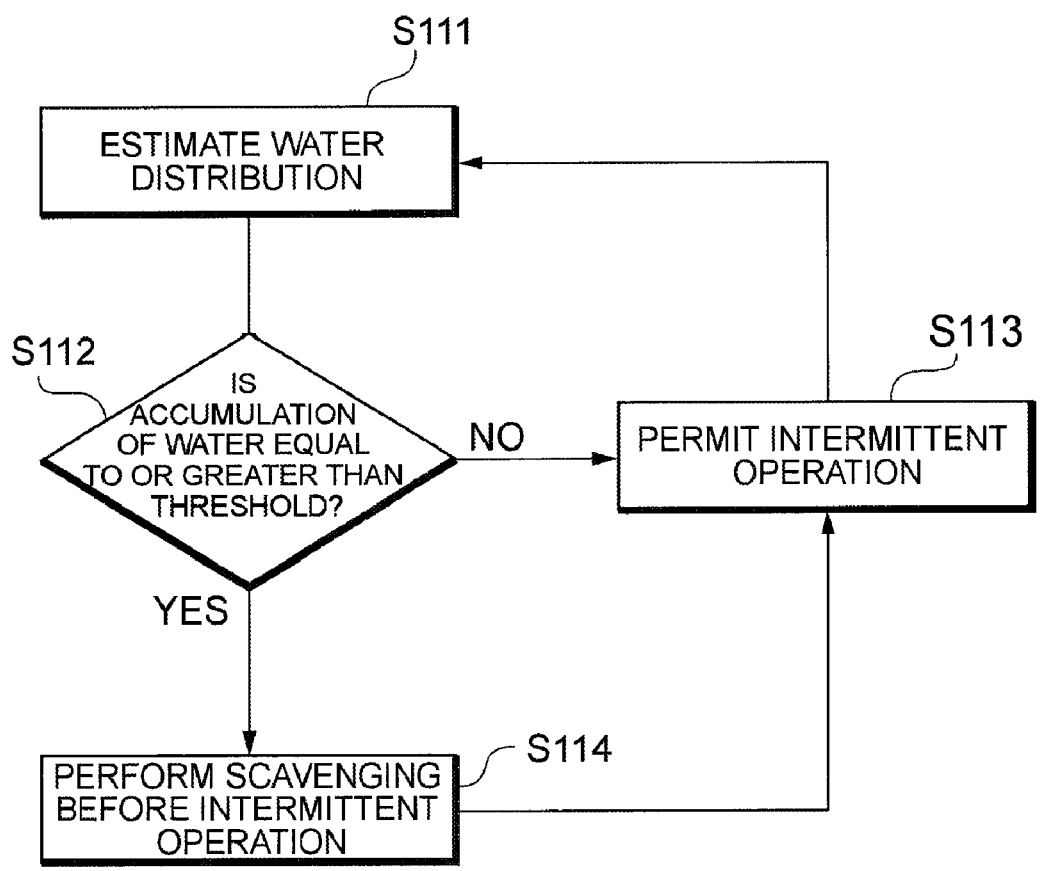
FIG. 25 is a diagram illustrating a flow of a scavenging process prior to an intermittent operation according to a second control example of the embodiment.
Figure 26:
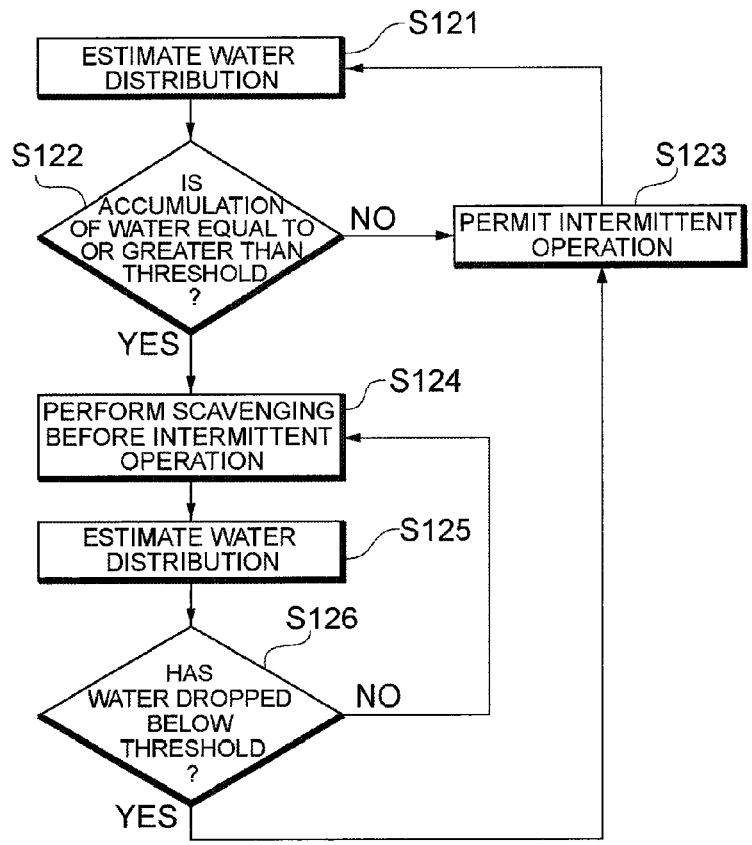
FIG. 26 is a diagram illustrating a flow of a scavenging process prior to an intermittent operation according to a modification of the second control example.
Figure 27:
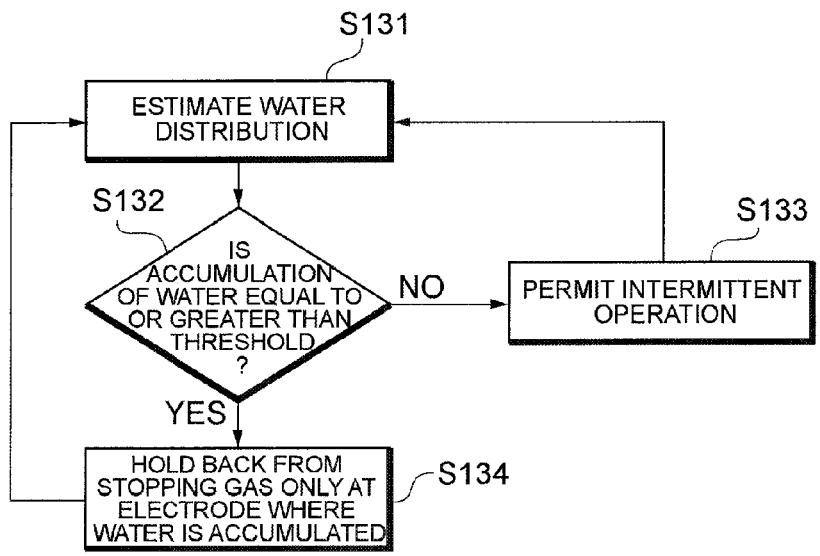
FIG. 27 is a flow chart illustrating a flow of changing a content of an intermittent operation according to a third control example of the embodiment.
Figure 28:
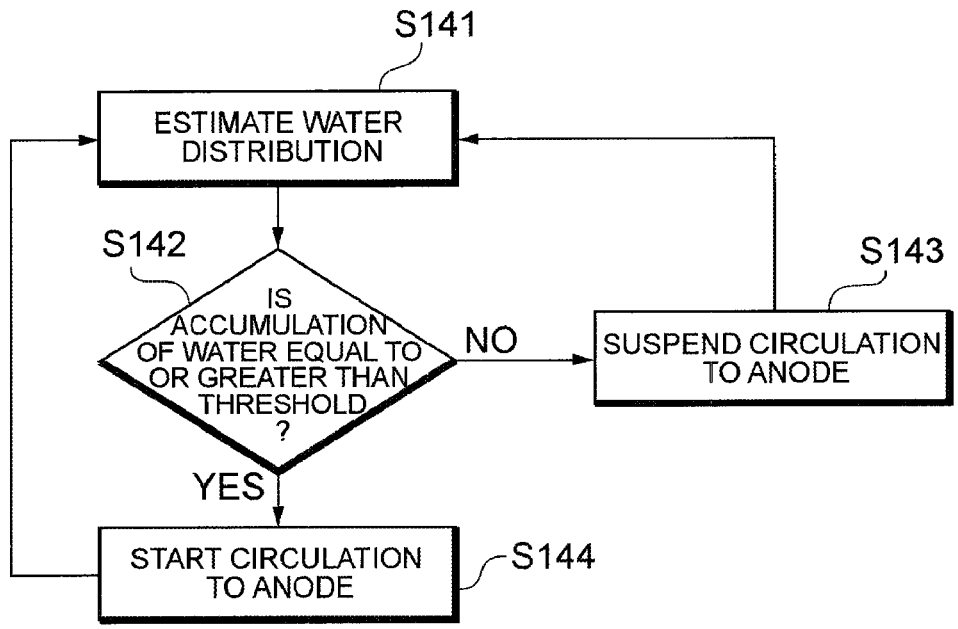
FIG. 28 is a flow chart illustrating a flow of a circulating operation process during an intermittent operation according to a fourth control example of the embodiment.
Figure 29:
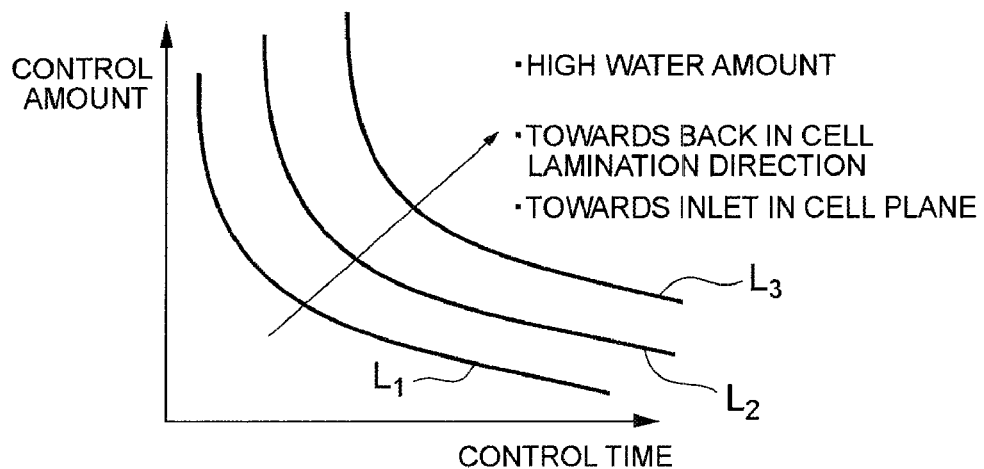
FIG. 29 is a diagram illustrating an example of a drive method of a hydrogen pump in the flow of the circulating operation process according to the fourth control example.

1: fuel cell
2: single cell
2a: primary cell
2b: end cell
23: electrolyte membrane
24A: anode electrode
24B: cathode electrode
25A: hydrogen flow channel (fuel gas flow channel)
25B: air flow channel (oxidation gas flow channel)
67: estimating unit
68: operation control unit
100: fuel cell system
300: air piping system
400: hydrogen piping system
500: coolant piping system
600: controller

The invention claimed is:

1. A fuel cell system comprising:
fuel cell having a cell laminate formed by laminating a plurality of single cells, each of the single cells having an anode electrode, a cathode electrode, an electrolyte membrane between the anode electrode and the cathode electrode, and a reactant gas flow channel;
an estimating unit programmed to estimate a residual water content distribution in the reactant gas flow channel in a cell plane of each single cell, wherein the estimating unit is programmed to consider water transfer that occurs between the anode electrode and the cathode electrode via the electrolyte membrane; and
an operation control unit programmed to control intermittent operation of the fuel cell and to change the intermittent operation when the residual water content in the reactant gas flow channel estimated by the estimating unit is equal to or greater than a predetermined threshold,
wherein during the intermittent operation, operations of auxiliaries which supply reactant gas to the anode electrode and the cathode electrode are suspended.

2. The fuel cell system according to claim 1, wherein the operation control unit is programmed to prohibit the intermittent operation when a residual water content equal to or greater than the threshold is estimated.

3. The fuel cell system according to claim 1, wherein the operation control unit is programmed to permit the intermittent operation after performing a scavenging process on the fuel cell when a residual water content equal to or greater than the threshold is estimated.

4. The fuel cell system according to claim 3, wherein the operation control unit is programmed to change at least one of a control amount of scavenging gas to be fed into the reactant flow channel, and a control time of the scavenging process based on at least one of a position in which a residual water content that equals or exceeds the threshold exists and a size of a residual water content that equals or exceeds the threshold.

5. The fuel cell system according to claim 4, wherein the reactant gas flow channel of each single cell is configured such that the reactant gas is supplied in the cell lamination direction, and
the operation control unit is programmed to increase at least one of the control amount and the control time of the scavenging process the further a single cell in which a residual water content that equals or exceeds the threshold exists is positioned on a downstream side in the supply direction of the reactant gas in the cell laminate.

6. The fuel cell system according to claim 4, wherein the operation control unit is programmed to increase at least one of the control amount and the control time of the scavenging process the closer the reactant gas flow channel in which a residual water content that equals or exceeds the threshold exists is to an inlet of the reactant gas in a cell plane.

7. The fuel cell system according to claim 3, wherein the reactant gas flow channel includes a fuel gas flow channel for supplying fuel gas to the anode electrode and an oxidation gas flow channel for supplying oxidation gas to the cathode electrode, and
the operation control unit is programmed to execute the scavenging process on the fuel gas flow channel when it is estimated that a residual water content of the fuel gas flow channel is equal to or greater than the threshold, and
the operation control unit is programmed to execute the scavenging process on the oxidation gas flow channel when it is estimated that a residual water content of the oxidation gas flow channel is equal to or greater than the threshold.

8. The fuel cell system according to claim 3, wherein the estimating unit is programmed to estimate the residual water content distribution even during the scavenging process, and
wherein the operation control unit is programmed to permit the intermittent operation when a residual water content estimated during the scavenging process falls below the threshold.

9. The fuel cell system according to claim 1, wherein the operation control unit is programmed to perform a circulating operation process for resupplying fuel gas discharged from an anode electrode-side to the anode electrode during the intermittent operation when a residual water content equal to or greater than the threshold is estimated.

10. The fuel cell system according to claim 9, wherein the operation control unit is programmed to change an amount of gas circulated, a length of time of the circulating operation process, or both based on at least one of a position of a residual water content that equals or exceeds the threshold and a size thereof.

11. The fuel cell system according to claim 1, wherein the reactant gas flow channel includes a fuel gas flow channel for supplying fuel gas to the anode electrode and an oxidation gas flow channel for supplying oxidation gas to the cathode electrode, and the threshold differs between the side of the fuel gas flow channel and the side of the oxidation gas flow channel.

12. The fuel cell system according to claim 1, wherein the threshold differs among positions of single cells in the cell lamination direction.

13. The fuel cell system according to claim 1, wherein the threshold differs between an inlet-side and an outlet-side of reactant gas to/from the reactant gas flow channel in a cell plane.

14. A method of operating a fuel cell system comprising a fuel cell having a cell laminate formed by laminating a plurality of single cells, each of the single cells having an anode electrode, a cathode electrode, an electrolyte membrane between the anode electrode and the cathode electrode, and a reactant gas flow channel, the method comprising:
- estimating a residual water content distribution in the reactant gas flow channel in a cell plane of each single cell, including water transfer that occurs between the anode electrode and the cathode electrode via the electrolyte membrane; and
- changing intermittent operation when the residual water content in the reactant gas flow channel estimated is equal to or greater than a predetermined threshold,
- wherein during the intermittent operation, operations of auxiliaries which supply reactant gas to the anode electrode and the cathode electrode are suspended.

15. The method according to claim 14, further comprising prohibiting the intermittent operation when a residual water content estimated is equal to or greater than the threshold.

16. The method according to claim 14, further comprising performing a scavenging process on the fuel cell when a residual water content estimated is equal to or greater than the threshold; and permitting the intermittent operation after performing the scavenging process.

17. The method according to claim 16, wherein the reactant gas flow channel includes a fuel gas flow channel for supplying fuel gas to the anode electrode and an oxidation gas flow channel for supplying oxidation gas to the cathode electrode, the method further comprising:
- executing the scavenging process on the fuel gas flow channel when the residual water content of the fuel gas flow channel estimated is equal to or greater than the threshold; and
- executing the scavenging process on the oxidation gas flow channel when the residual water content of the oxidation gas flow channel is equal to or greater than the threshold.

18. The method according to claim 16, further comprising estimating the residual water content distribution even during the scavenging process, and permitting the intermittent operation when a residual water content estimated during the scavenging process falls below the threshold.

19. The method according to claim 14, further comprising performing a circulating operation process for resupplying fuel gas discharged from an anode electrode-side to an anode electrode during the intermittent operation when a residual water content equal to or greater than the threshold is estimated.

20. The method according to claim 14, wherein the reactant gas flow channel includes a fuel gas flow channel for supplying fuel gas to the anode electrode and an oxidation gas flow channel for supplying oxidation gas to the cathode electrode, and the threshold differs between the side of the fuel gas flow channel and the side of the oxidation gas flow channel.

21. The method according to claim 14, wherein the threshold differs among positions of single cells in the cell lamination direction.

22. The method according to claim 14, wherein the threshold differs between an inlet-side and an outlet-side of reactant gas to/from the reactant gas flow channel in a cell plane.

23. The method according to claim 14, further comprising: measuring a current value, a cell inlet temperature, a cell outlet temperature, an air flow rate, a hydrogen flow rate, an air back pressure, and a hydrogen pressure; and using the measurements to estimate the residual water content distribution.

24. The fuel cell system according to claim 1, further comprising a current sensor, a cell inlet temperature sensor, a cell outlet temperature sensor, an air flow rate sensor, a hydrogen flow rate sensor, an air back pressure sensor, and a hydrogen pressure sensor.

* * * * *